(12) United States Patent
Yoo et al.

(10) Patent No.: US 6,753,110 B1
(45) Date of Patent: Jun. 22, 2004

(54) CATHODE ACTIVE MATERIAL FOR LITHIUM ELECTROCHEMICAL CELLS

(75) Inventors: Yeong-Chang Yoo, Nepean (CA); Do-Young Seung, Seoul (KR); Isobel Davidson, Orleans (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 09/857,701

(22) PCT Filed: Feb. 28, 2000

(86) PCT No.: PCT/CA00/00194
§ 371 (c)(1),
(2), (4) Date: Aug. 20, 2001

(87) PCT Pub. No.: WO01/28010
PCT Pub. Date: Apr. 19, 2001

Related U.S. Application Data
(60) Provisional application No. 60/158,303, filed on Oct. 8, 1999.

(51) Int. Cl.$^7$ ................................................ H01M 4/58
(52) U.S. Cl. .............................. 429/231.95; 429/231.9; 429/224; 423/595; 423/596; 423/594.15
(58) Field of Search ................................. 423/595, 596, 423/594.15; 429/231.9, 231.95, 224

(56) References Cited

U.S. PATENT DOCUMENTS 5,370,949 A * 12/1994 Davidson et al. ............ 429/224
5,858,324 A * 1/1999 Dahn et al. .................. 423/596

* cited by examiner

*Primary Examiner*—Bruce F. Bell
(74) *Attorney, Agent, or Firm*—J. Wayne Anderson

(57) ABSTRACT

The invention disclosed relates to a compound of molecular formula $Li_xCr_yMn_{2-y}O_{4+z}$, wherein $2.2<x<4$, $0<y<2$ and $z \geq 0$, and to the use of this compound as a cathode material in secondary lithium and lithium ion cells.

21 Claims, 26 Drawing Sheets

Specific capacity at 3.6 mA/g of Li2+xCryMn2-yO4+z samples prepared by the co-precipitation process from indicated metal salts.

Specific capacity at 14.5 mA/g of $Li_{2+x}Cr_yMn_{2-y}O_{4+z}$ samples prepared by the co-precipitation process from indicated metal salts.

US 6,753,110 B1

CATHODE ACTIVE MATERIAL FOR LITHIUM ELECTROCHEMICAL CELLS

This application claims the benefit of Provisional application No. 60/158,303 filed Oct. 8, 1999.

BACKGROUND OF THE INVENTION

This invention relates to a compound of molecular formula $Li_xCr_yMn_{2-y}O_{4+z}$, wherein $2.2<x<4$, $0<y<2$ and $z\geqq 0$, and to the use of this compound as a cathode material in secondary lithium and lithium ion cells.

The impetus for this invention was the recent, great increase in demand for rechargeable batteries that combine high specific and volumetric energy density and with low cost and thermal stability.

DESCRIPTION OF THE PRIOR ART

A lithium ion cell is a rechargeable electrochemical cell in which the electrochemically active components in both the cathode and the anode are lithium intercalation compounds. The intercalation compound serves as a host structure for lithium ions, which are either stored or released depending on the polarity of an externally applied potential. A lithium ion cell consists of a lithium intercalation cathode with an oxidizing potential and a lithium intercalation anode with a reducing potential. A lithium intercalation material is able to reversibly store and release lithium ions in response to an electrochemical potential. On discharge, in a lithium ion cell, lithium ions move from the anode to the cathode, and thereby, generate an electrochemical current. On charge, energy is consumed in forcing the lithium ions from the cathode to the anode. The greater the difference in the potentials of the cathode and the anode the greater the electrochemical potential of the resulting cell. The larger the amount of lithium which can be reversibly stored in and released from the cathode and the anode, the greater the capacity. The cell's discharge capacity reflects the time duration for which a cell can deliver a given current. Typical anodes for a lithium ion cell are made from carbonaceous materials such as graphite or petroleum cokes. Typical cathodes are made from transition metal oxides or sulphides. For ease of cell fabrication, lithium ion cells are normally built in the fully discharged state with lithium present only in the cathode and not in the anode. In this state usually both the anode and the cathode materials are air stable. Assembling the cell in the discharged state means that the ultimate capacity of the cell depends on the amount of lithium initially present in the cathode. For example, cathodes based on $LiMnO_2$ have twice the theoretical capacity of cathodes based on $LiMn_2O_4$.

Previous reports and patents on cathodes for lithium ion cells have proposed using various mixed oxides of lithium, such as $LiCoO_2$, $LiNiO_2$, $LiNi_xCo_{1-x}O_2$ and $LiMn_2O_4$ as the active material.

The use of phases such as $LiMn_{2-x}Cr_xO_{4.35}$ where $0.2<x<0.4$, and $LiCr_xMn_{2-x}O_4$ where $0<x<1$, in secondary lithium batteries which have a metallic lithium anode, are also known. See G. Pistoia et al, Solid State Ionics, 58, 285 (1992) and B. Wang et al, Studies of $LiCr_xMn_{2-x}O_4$ for Secondary Lithium Batteries, extended Abstract from the Sixth International Meeting on Lithium Batteries, Munster, Germany, May 10–15, 1992. (See also J. Power Sources, 43–44. 539–546 (1992). The materials are described in the latter case as being of a cubic lattice structure. Also in the latter case, additional Li was inserted electrochemically. However, only an additional 0.4 mole equivalents of lithium could be inserted e.g. to provide an oxide of molecular formula $Li_{1.4}Cr_{0.4}Mn_{1.6}O_4$.

Also, a lithium-poor lithium-manganese spinel structure for use in secondary electrochemical cells, having a molecular formula of $Li_qM_xMn_yO_z$ where q is 0 to 1.3, is described in U.S. Pat. No. 5,169,736.

More recently, the amount of lithium in such mixed metal oxides has been increased. In our previous U.S. Pat. No. 5,370,949, issued 6 Dec. 1994, a single phase compound of molecular formula $Li_2Cr_xMn_{2-x}O_4$, wherein $0<x<2$, and its use in secondary lithium ion cells is described. These materials were prepared by standard solid state techniques and demonstrated good cycleability with discharge capacities up to 170 mAh/g at low current densities (3.6 mA/g). Higher discharge capacities were found for compositions in which at least half of the transition metal content was manganese. However phases with significantly more manganese than chromium developed a less commercially attractive two-plateau voltage curve on the first or subsequent discharges. Further structural and electrochemical characterization of these cathode materials was published by us in two papers in the Journal of Power Sources (volume 54, pages 205–208, in 1995 and volumes 81–82, pages 406–411, in 1999).

Another related material is described in U.S. Pat. No. 4,567,031 of Riley, issued 28 Jan. 1986. The abstract of this reference describes a mixed metal oxide having the formula $Li_xM_yO_z$ where M is at least one metal selected from the group consisting of titanium, chromium, manganese, iron, cobalt and nickel. It is significant that none of the enabled structures include Mn or Cr. Moreover, there is no enabled disclosure of the use of such compounds as cathodes for secondary cells.

Also, the preparation and characterization of materials of compositions $Li_2Cr_xMn_{2-x}O_4$ in which $1.0\leqq x\leqq 1.5$ was described by Dahn, Zheng and Thomas (J. Electrochem. Soc., 145, 851–859, Mar. 1998). These materials were made using a sol-gel technique followed by heating in an inert atmosphere to temperatures ranging from 500 to 1100° C. In this study a maximum discharge capacity of 150 mAh/g at a low current density (1.5 mA/g) was found for a sample of composition $Li_2Cr_{1.25}Mn_{0.75}O_4$ which had been prepared at 700° C. The same sample cycled at 15 mA/g showed a capacity of about 137 mAh/g. The materials prepared at 700° C. were all found by powder x-ray diffraction to have a layered structure like $LiCoO_2$ with a hexagonal unit cell symmetry. The volume of the crystallographic unit cells varied from 68.6 to 71.9 cubic angstroms per formula unit of $Li_2Cr_xMn_{2-x}O_4$.

U.S. Pat. No. 5,858,324 issued Jan. 12, 1999 discloses a process for preparing a compound of formula $Li_yCr_xMn_{2-x}O_{4+z}$ where $y\geqq 2$, $0.25<x<2$ and $z\geqq 0$. The experimental examples provided in the disclosure demonstrated the use of these materials as the active cathodes in rechargeable lithium ion electrochemical cells. The $Li_yCr_xMn_{2-x}O_{4+z}$ samples were prepared as in the J. Electrochem. Soc. (145, 851–859, March 1998) publication from chromium nitrate nonahydrate, manganese (II) acetate tetrahydrate and lithium hydroxide monohydrate by a sol-gel process using ammonium hydroxide as the gelling agent. The gels were heat treated in inert atmosphere at temperatures ranging from 500 to 1100° C. to form $Li_yCr_xMn_{2-x}O_{4+z}$ compounds.

The compounds were characterized by Reitveld refinement of crystallographic unit cell dimensions from powder x-ray diffraction data. The symmetry and space group of the compounds was found to depend on the composition and processing temperature. The structure refinements and chemical analyses of the compositions studied are summarized in Table 1 of the patent (U.S. Pat. No. 5,858,324). Table 1 of the patent (U.S. Pat. No. 5,858,324) summarizes the structure refinements and chemical analyses for the 37 samples studied. Only two of the examples (samples 22 and 23) of $Li_yCr_xMn_{2-x}O_{4+z}$ have compositions in which y is greater than 2.0. The value of x ranges from 0.5 to 1.5 and the value of z as reported in table 6 is zero.

Only samples prepared at the lowest temperatures, 500 or 600° C., have crystallographic unit cell volumes per stoichiometric unit which are substantially smaller than that of $LiCrO_2$ at 69.9 cubic Angstroms. Electrochemical characterization of these samples is not provided in the (U.S. Pat. No. 5,858,324) patent disclosure. The compositions of $Li_yCr_xMn_{2-x}O_{4+z}$ in examples 22 and 23 listed in table 1 of U.S. Pat. No. 5,858,324 have y equal to 2.2 and x equal to 1.25. The crystallographic unit cell volumes per stoichiometric unit for example 22 which was prepared at 500° C. at 68.532 cubic Angstroms is significantly less than the 69.9 to 74.3 cubic Angstroms range provided for the same compounds as described in our previous U.S. Pat. No. 5,370,949. Electrochemical characterization of sample 22 is not provided in the U.S. Pat. No. 5,858,324 patent. The electrochemical evaluation of Example 23 from U.S. Pat. No. 5,858,324 which has a composition of $Li_{2.2}Cr_{1.25}Mn_{0.75}O_4$ and a normalized unit cell volume of 69.81 cubic Angstroms is summarized in Table 6. The discharge capacity of this sample can be compared with that of example 3—3 in the same table, which has a composition of $Li_2Cr_{1.25}Mn_{0.75}O_4$, a normalized crystallographic unit cell volume of 70.18 cubic Angstroms, and was tested under the same electrochemical conditions. Example 23 demonstrated a discharge capacity of 117 mAh/g only slightly better than that of example 3—3 at 106 mAh/g. This small difference in the discharge capacities of the two examples falls within the normal range of variability between cells containing identical cathodes.

The U.S. Pat. No. 5,858,324 patent was also filed as an international PCT application (WO 98/46528 and PCT US98/04940).

A similar material is described in Japanese Kokai 07,272, 765, published 20 Oct. 1995. In this reference, the mixed oxide is sintered with vanadium compounds to form a positive electrode material for a secondary cell.

SUMMARY OF THE INVENTION

It is an object of the present invention to provide novel lithium oxide materials for use as the active material in cathodes for lithium ion electrochemical cells.

It is another object of the present invention to provide a secondary electrochemical cell of high energy density, whose charge/discharge mechanism is based upon alternating intercalation and deintercalation of $Li^+$ ions in the active materials of the positive and negative electrodes.

It is a further objective of this invention to provide materials useful as cathodes in lithium ion cells that exhibit unusually large charge and discharge capacities.

It is yet another object to provide good chemical resistance to the electrolyte and high cycling stability.

It is a further object of this invention to provide compounds containing greater amounts of lithium. Increased lithium content provides additional paths for lithium ion mobility and increases the theoretical capacity of the cathode.

According to one aspect of the invention, a novel compound of molecular formula I, $$Li_xCr_yMn_{2-y}O_{4+z} \qquad \qquad I$$

wherein $2.2<x<4.0$, $0<y<2$ and $z \geq 0$, is provided.

While it is preferred that the value of x be in the range of about 2.2 to about 4, it is more preferred that x be in the range of 2.2 to 3.6.

Similarly, while it is more preferred that the value of y be in the middle and lower end of the range, i.e. about 0.1 to about 1.75, useful compounds according to the invention toward the upper end of the range, i.e. up to about 1.9 are included.

In addition, it is preferred that z be >0, it is more preferable that $0<z \leq 2.6$.

The compounds of formula I may be further characterised by the crystallographic unit cell volume when indexed in hexagonal symmetry to a R–3 m structure, being smaller than that of $LiCrO_2$ i.e. smaller than 104.9 cubic angstroms, and yet further characterized by the average cation to anion bond distance being smaller than that of $LiCrO_2$. This value is available in the literature.

According to another aspect of the invention, the use of compounds of molecular formula I as active cathode material in secondary lithium ion electrochemical cells is also provided.

According to yet another aspect of the invention, a secondary lithium ion electrochemical cell comprising a lithium intercalation anode, a suitable non-aqueous electrolyte including a lithium salt, a cathode of a compound of formula I as defined above as initial active material, and a separator between anode and cathode is provided.

According to a further aspect of the invention, several processes for making the novel compounds of molecular formula I, are provided. The details of the processes are described below.

The anode of the present invention serves as the recipient for $Li^+$ ions. Accordingly, the anode can be of any intercalation compound, which is capable of intercalating lithium and has an electrode potential sufficiently reducing to provide an adequate cell voltage over a range of lithium intercalation. Specific examples include transition metal oxides such as $MoO_2$ or $WO_2$ [Auborn and Barberio, *J. Electrochem. Soc.* 134 638 (1987)], the disclosure of which is incorporated herein by reference, transition metal sulfides (see also U.S. Pat. No. 4,983,476) or carbon products obtained by the pyrolysis of organic compounds. As will be apparent hereinafter, various commercially available carbonaceous materials of predetermined structural characteristics have proven useful.

The cathode of molecular formula I as defined above, is an intercalation compound with an electrochemical potential sufficiently positive of the anode to produce a useful overall cell voltage. The greater the potential, the greater the resulting energy density. The cathode generally serves as the initial reservoir of lithium. The capacity of the cell will be limited by the amount of lithium, available for deintercalation, present in the cathode. In most cases, only a proportion of the lithium present, during fabrication of the cathode can be reversibly deintercalated.

The non-aqueous electrolyte of the present invention can be liquid, paste-like or solid. In particular, the electrolyte could be a solid or gelled polymer. Polymers useful for electrolytes in lithium cells include polyvinylidene fluoride (PVDF), with and without co-polymers, and polyethylene oxide (PEO). The electrolyte typically includes a lithium salt in a liquid organic solvent. Lithium salts useful for this purpose include LiAsF$_6$, LiPF$_6$, LiBF$_4$, LiClO$_4$, LiBr, LiAlCl$_4$, LiCF$_3$SO$_3$, LiC(CF$_3$SO$_2$)$_3$, LiN(CF$_3$SO$_2$)$_2$, and mixtures thereof. LiAsF$_6$ should be used with caution due to its toxicity. As a water-free solvent for these salts, there can be used alone or in mixture with others an organic solvent of the group propylene carbonate, ethylene carbonate, 2-methyl tetrahydrofuran, tetrahydrofuran, dimethoxyethane, diethoxyethane, dimethyl carbonate, diethyl carbonate, methyl acetate, methylformate, γ-butyrolactone, 1,3-dioxolane, sulfolane, acetonitrile, butyronitrile, trimethylphosphate, dimethylformamide and other like organic solvents. The electrolyte solution can also contain additives such as Crown ethers eg. 12-C-4, 15-C-5, and 18-C-6, or immobilising agents such as polyethylene oxide or inorganic gel-forming compounds such as SiO$_2$, or Al$_2$O$_3$ such as described in U.S. Pat. No. 5,169,736, the disclosure of which is incorporated herein by reference.

DESCRIPTION OF THE PREFERRED EMBODIMENT(S)

Figure 1:
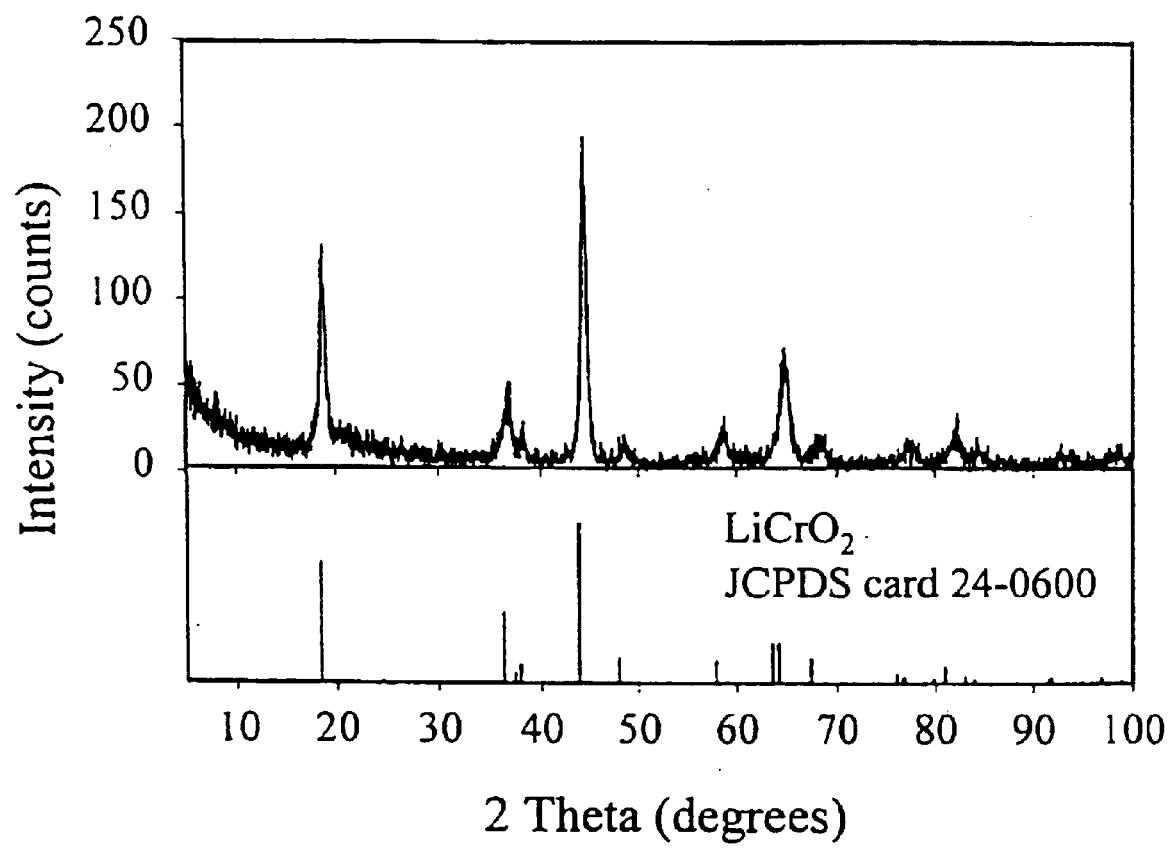
FIG. 1 is a x-ray diffraction pattern of a sample prepared according to example 1.

The present invention relates to discovery of related phases with higher lithium content, and in some cases higher oxygen contents. As will be apparent from the examples which follow, these phases exhibit both a high capacity and a sloping, single-plateau voltage curve. They are synthesized at temperatures in the range of 600 to 800° C. Since they are prepared at moderate temperatures it is advisable to establish thoroughly homogeneous mixing of the precursors prior to firing. Consequently techniques which are known to be very effective at preparing homogeneous mixtures of fine powders have been employed. These include co-precipitation, spray-drying and polymer complexation. All three of these techniques have been shown to work and are described in detail in the subsequent examples. The first two techniques were found to produce materials with exceptionally high capacities and rate capabilities.

In particular, the materials provided in this invention exhibit a large discharge capacity in a sloping, single-plateau voltage curve at potentials greater than 2.5 volts relative to the potential of metallic lithium.

The idea of these processes is to prepare a uniform mixture of finely divided metals salts, which can serve as precursors for the synthesis of lithiated transition metal oxides containing one or more transition metals. For example, in the spray drying process solutions of Mn(CH$_3$CO$_2$)$_2$ and Cr$_3$(OH)$_2$(CH$_3$CO$_2$)$_7$ were employed. However any combination of water-soluble metal salts which can be decomposed thermally to the metal oxides could be used. Other suitable salts include metal nitrates, sulfates, hydroxides, oxyhydroxides, formates, citrates, and other organic salts. A lithium containing precursor such as lithium hydroxide, lithium nitrate, lithium sulfate, lithium acetate, lithium carbonate, lithium oxide or lithium chloride could also be intimately mixed with the transition metal salts before thermal decomposition to the oxides. Alternatively, the lithium precursor can be reacted with the transition metal oxides prepared by thermal decomposition of the mixed metal salts.

There are many ways to prepare homogeneous mixtures of fine powders, for example: sol-gel, co-precipitation, freeze drying, spray drying and others. Of these methods, co-precipitation has been widely used in the field of Ni—MH battery for manufacturing spherical type Ni(OH)2 powder. In order to apply this technique to the Li system, initially composite hydroxides comprising Cr and Mn are made through co-precipitation of chromium and manganese hydroxides by adding an alkali aqueous solution to a mixed aqueous solution containing chromium and manganese salts. Then the composite hydroxides are mixed with lithium compounds such as lithium hydroxide, lithium oxide or lithium carbonate and heat-treated at particular temperature range in an Argon atmosphere to make the cathode active material Li$_x$Cr$_y$Mn$_{2-y}$O$_{4+z}$ where $2.2<x<4$, $0<y<2$ and $z\geq0$.

Co-precipitation procedures can be used to prepare a range of Li$_x$Cr$_y$Mn$_{2-y}$O$_{4+z}$ materials. The co-precipitation method starts by preparing mixed metal hydroxides from soluble metal salts such as nitrates, sulfates, acetates or chlorides. The metal salts are dissolved in de-ionized water, and then mixed with an aqueous alkali solution under controlled conditions of temperature, pH, and concentration. The resulting metal hydroxides are mixed with a source of lithium such as lithium oxide, lithium hydroxide or lithium carbonate and fired at a variety of processing temperatures in an inert atmosphere. The heat treatment is used to complete the reaction and to control the oxidation state of each transition metal. The oxidation states of the transition metals are critical to the material's crystal structure and electrochemical performance. The temperature of the heat treatment and the oxygen content within the reaction vessel will affect the oxidation states of the transition metals.

For example, co-precipitation of a Cr—Mn composite hydroxide can be prepared as follows. An aqueous solution containing a mixture of water-soluble chromium and manganese salts such as chromium nitrate and manganese nitrate or chromic sulfate hydrate and manganese sulfate is prepared by mixing the transition metal salts with de-ionized water. The co-precipitation of Cr hydroxide and Mn hydroxide is caused by controlled addition of an alkali aqueous solution containing an alkali such as ammonium hydroxide, potassium hydroxide, sodium hydroxide, lithium hydroxide or mixtures thereof into the aqueous solution of transition metal salts. Then the Cr—Mn composite hydroxide is collected by filtering the deposits and rinsing them with water. The resulting composite hydroxide is then dried in an oven at 100° C. The dried composite hydroxide is then mixed with a source of lithium such as lithium oxide, lithium hydroxide or lithium carbonate and the mixture is heat-treated in Argon for 24 hours at various temperatures between 600 and 1000° C. Characterization by powder X-ray diffraction and typical electrochemical data for materials prepared by the co-precipitation method is provided in the example 4. The materials with the best electrochemical performance were those that were heat-treated at 650–750° C.

In a typical synthesis of $Li_xCr_yMn_{2-y}O_{4+z}$ phases by the spray drying process solutions of metal salts were spray dried in a commercial spray dryer and then thermally decomposed to oxides at temperatures between 400 and 450° C. The dried metal oxide powder was then reacted with a lithium compound under controlled conditions. Suitable lithium compounds include lithium oxides or any compounds that can be thermally decomposed to the oxide such as lithium hydroxide, lithium carbonate, lithium nitrate, lithium sulfate, or lithium acetate. The mixtures were carefully dried and calcined in air and then heat-treated in an argon atmosphere to form the active cathode materials.

The compounds of formula I are further characterised by characteristic X-ray powder diffraction patterns. More specifically, the X-ray powder diffraction patterns of compounds of Formula I are similar to that of $LiCrO_2$ with the exception that the reflections are shifted to higher diffraction angles corresponding to smaller crystallographic unit cell size. It can be expected that the volume of the crystallographic unit cell will decrease with increasing lithium content. The increase in lithium content is effectively a partial substitution of lithium atoms for transition metal atoms and must be balanced by the partial oxidation of the remaining transition metals. The oxidation state of the manganese might, for example, be increased from +3 to +4 by the substitution of lithium atoms for transition metal atoms. This would result in a decrease in the crystallographic unit cell volume because the weighted average of the ionic radii of the cations will have decreased. That is substituting $Li^+$ and $Mn^{+4}$ in the 1:2 ratio, which would maintain charge balance, for $Cr^{+3}$ or $Mn^{3+}$ will result in a smaller average ionic radius.

The X-ray powder diffraction patterns of compounds of formula I resemble the diffraction pattern of $LiCrO_2$, which has a hexagonal unit cell with a crystallographic structure belonging to the space group R −3 m. Although the crystallographic structure of compounds of formula I have not been determined in detail, the X-ray diffraction patterns can be approximately indexed to hexagonal crystallographic unit cells like that of $LiCrO_2$. Comparison of crystallographic unit cell dimensions between related structures provides information about relative bond distances and oxidation states. Volumetric comparisons of related crystal structures are most useful between crystallographic volumes that contain the same number of atoms. Since $Li_xCr_yMn_{2-y}O_{4+z}$ phases do not necessarily contain an equal number of cations and anions, the quantity of cation or anion sites in the crystal structure must be chosen for making volumetric comparisons. After normalization to the same quantity of anion sites, the crystallographic unit cell volumes of $Li_xCr_yMn_{2-y}O_{4+z}$ compounds are smaller than that of $LiCrO_2$.

For example, $LiCrO_2$ has a hexagonal unit cell with a=2.899 Å and c=14.412 Å (ICDD card #24-600), and the X-ray powder diffraction pattern of $Li_3Cr_{1.1}Mn_{0.9}O_{4.1}$ (from example 2) can be indexed to a hexagonal unit cell with a=2.876 Å and c=14.253 Å. The corresponding crystallographic unit cell volumes are 104.9 $Å^3$ for $LiCrO_2$ and 102.1 $Å^3$ for $Li_3Cr_{1.1}Mn_{0.9}O_{4.1}$ based on a hexagonal R −3 m structure. Similarly $Li_{3.1}Cr_{1.34}Mn_{0.66}O_{5.8}$ from Table 4 in the examples to follow has a crystallographic unit cell volume of 102.92 $Å^3$. In comparison, the crystallographic unit cell volume of $Li_2CrMnO_4$ for a similar number of atomic sites is 107.69 $Å^3$ (J. Power Sources, vol. 81–82, p. 406–411, 1999).

The invention relates to a compound having the formula $Li_xCr_yMn_{2-y}O_{4+z}$ wherein $2.2<x<4$, $0<y<2$, and $z \geq 0$ and an electrode composition containing this compound. In the embodiment of the invention in which the compound is used as the active agent in an electrode, the initial composition has the formula $Li_xCr_yMn_{2-y}O_{4+z}$ wherein $2.2<x<4$, $0<y<2$, and $z \geq 0$, and in the course of utilizing the compound as an electrode, the composition can vary in x from 4 to 0.

As indicated above, while it is preferred that the value of x be in the upper end of the range, i.e. about 2.2 to about 4, and more preferably in the range of 2.5 to 3.6, useful intermediate compounds through the middle of the range where x is about 2, to the lower end of the range where x is near 0 are also within the scope of this invention.

As will be apparent hereafter, these intermediate compounds are formed by cycling an appropriate cell starting with a cathode of a material of formula I in which x is about 2.2 to about 4.

In the utilization of materials as electrodes structural changes often occur during the electrochemical cycling such that the initial structure is not necessarily maintained. In the examples to follow the change in shape of the voltage profile of the charge curve after the first charge suggests that a substantial structural change may have occurred.

As will be shown in the examples, to follow, compounds of the present invention have exceptionally good chemical stability. Greater chemical stability often results in enhanced safety in electrochemical cells. For example, see U.S. Pat. Nos. 4,983,276, 4,956,248, and 4,110,696.

The preferred negative electrode is based on a carbonaceous product. Suitable carbonaceous materials include:

1) carbonaceous material with a $d_{002}$ layer spacing of less than or equal to 3.70 Å with true density of greater than or equal to 1.70 $g/cm^3$ prepared by carbonization of furan resins, as per U.S. Pat. No. 4,959,281.

2) the above doped with 2–5% phosphorous and oxygenated petroleum or coal pitch carbonized and doped with 2–5% phosphorous with the same $d_{002}$ layer spacing and true density, as per published European application No: EP 0 418 514.

3) carbons formed by the thermal decomposition of gas phase hydrocarbons or hydrocarbon compounds with $d_{002}$ from 3.37 to 3.55 Å as per U.S. Pat. No. 4,863,814.

4) carbon formed from mesophase microspheres with $d_{002}$ layer spacing up to 3.45 Å as per U.S. Pat. No. 5,153,082.

5) commercial petroleum coke, as per U.S. Pat. No. 4,943,497.

6) isotropic graphite composed of a mixture of graphite and carbonized pitch with a degree of graphitization greater than or equal to 0.4 and heat treated fluid coke and commercial graphite whose first lithium electrochemical intercalation is performed at or above 50° C., as per U.S. Pat. No. 5,028,500.

(The disclosure of the aforementioned 6 references are incorporated herein by reference).

Typical electrodes in the present invention are fabricated from 70–94 weight percent of active material, graphitic carbon or $Li_xCr_yMn_{2-y}O_{4+z}$, 5–20 weight percent of a conductivity enhancer such as Super S carbon black and/or graphite, and 1–10 weight percent of a binder such as poly(vinylidene fluoride) (PVDF) or Kynar Flex®.

Other conductivity enhancers such as Shawinigan Acetylene Black, graphites or other conductive materials may be used. In addition, other binders such as Teflon®, ethylene propylene diene monomer (EPDM), polyolefins or elastomers may be substituted for Kynar Flex.

It will be apparent from the examples, which follow that the compounds of the invention have the following distinguishing characteristics. They contain a greater molar percentage of lithium than previously known related materials and therefore have a greater theoretical capacity in use as cathodes in a lithium ion cells. They are characterized by their composition, crystallographic unit cell dimensions, x-ray diffraction patterns, and shape of their voltage curves. When used as cathodes in secondary lithium or lithium ion cells, the compounds of the invention exhibit significant enhancement in discharge capacities relative to related cathode materials. In addition, secondary lithium or lithium ion cells with cathodes based on the compounds of the invention exhibit a broader operational voltage range. It is expected that a broader operational voltage range will facilitate higher currents and faster recharging times.

EXAMPLE 1

For example, a solution containing (12.30 g, 0.05 moles) of manganese acetate tetrahydrate, $Mn(CH_3CO_2)_2 4H_2O$ (Aldrich), and (10.05 g, ~0.0167 moles) of chromium acetate hydroxide, $Cr_3(OH)_2(CH_3CO_2)_7$ (Aldrich), dissolved in 500 ml of de-ionized water was dried in a commercial (Buchi 190) mini spray-drier. The dried metal acetate mixture was calcined in air at 400° C. for 3 hours. A mass of 2.8 g of this oxide was slurried with 13 ml of a 4M solution of lithium hydroxide in de-ionized water and heated treated in an alumina crucible in a tube furnace under a flow of air. The heating regime was controlled to heat the sample slowly, over 5.5 hours, to 450° C., hold at 450° C. for 2 hours and then allow the sample to cool slowly in the furnace to room temperature.

The sample was reground and then fired in a tube furnace at 700° C. for 3 hours under in a flow of argon gas. FIG. 1 is a x-ray diffraction pattern of the sample after heat-treatment. The diffraction pattern can be compared to that of $LiCrO_2$ as indicated by the bar diagram under the diffraction pattern. The diffraction pattern of the $Li_xCr_yMn_{2-y}O_{4+z}$ sample is similar to that of $LiCrO_2$ but there are differences in the relative intensities of the peaks and the peaks of $Li_xCr_yMn_{2-y}O_{4+z}$ are shifted to higher angle relative to those of $LiCrO_2$. Chemical analysis of the sample by atomic absorption found the composition to be Li(3.30±0.25)Mn(1.06±0.08)Cr(0.94±0.05)O(5.54±0.28), with the oxygen content estimated by difference.

The material was cast into an electrode sheet and tested in coin cells. Electrodes were prepared from a mixture of 0.456 g of active material, 0.047 g of Super S carbon black, and 0.049 g of graphite (Lonza KS4). The mixture was formed into a slurry with 1.206 g of a binder solution containing 3 weight percent of Kynar Flex 2801 in n-methyl pyrrolidinone (NMP) and cast as a film on aluminum foil by the doctor blade method. The cast was dried in air at low heat on a hot plate and then at 110° C. for twenty minutes in a convection oven. Electrode discs of 1.27 cm diameter were punched from the cast and densified by pressing each disc with a force of 500 lbs. on a hydraulic press. The electrodes typically had a thickness between 0.008 to 0.013 cm after pressing.

The electrochemical cycling was carried out in 2325 coin cells each containing an internal spring and spacer to maintain an adequate pressure on the electrode stack. The anodes were lithium (Foote Mineral) discs of 1.65 cm diameter and 0.05 cm thickness and electrolyte containing 1 M $LiPF_6$ in 1:1 ethylene carbonate (EC):dimethyl carbonate (DMC) (Mitsubishi Chemical).

Figure 2:
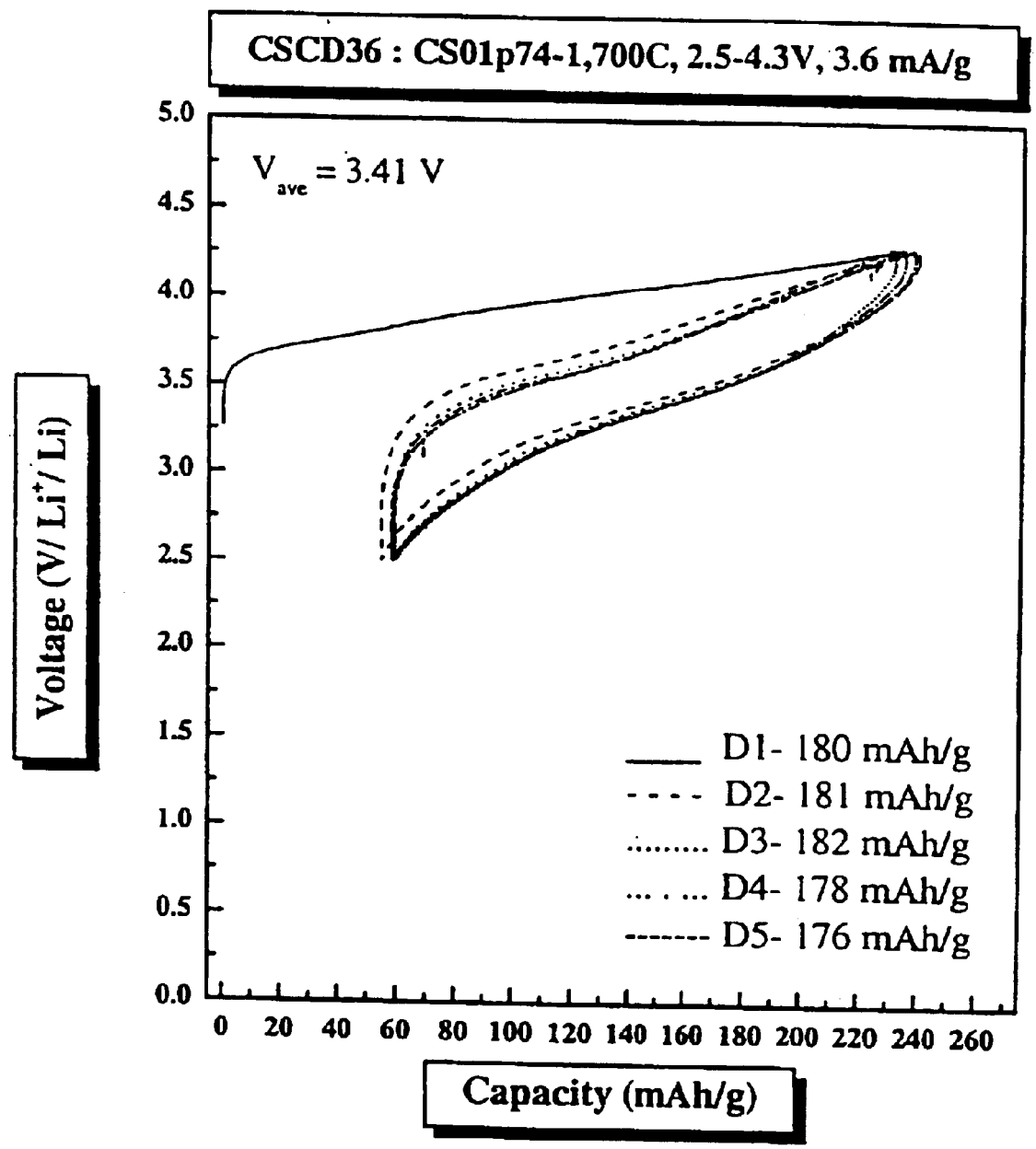
FIGS. 2 to 6 show specific capacities versus voltage or cycle number for electrochemical cells prepared according to example 1.
Figure 3:
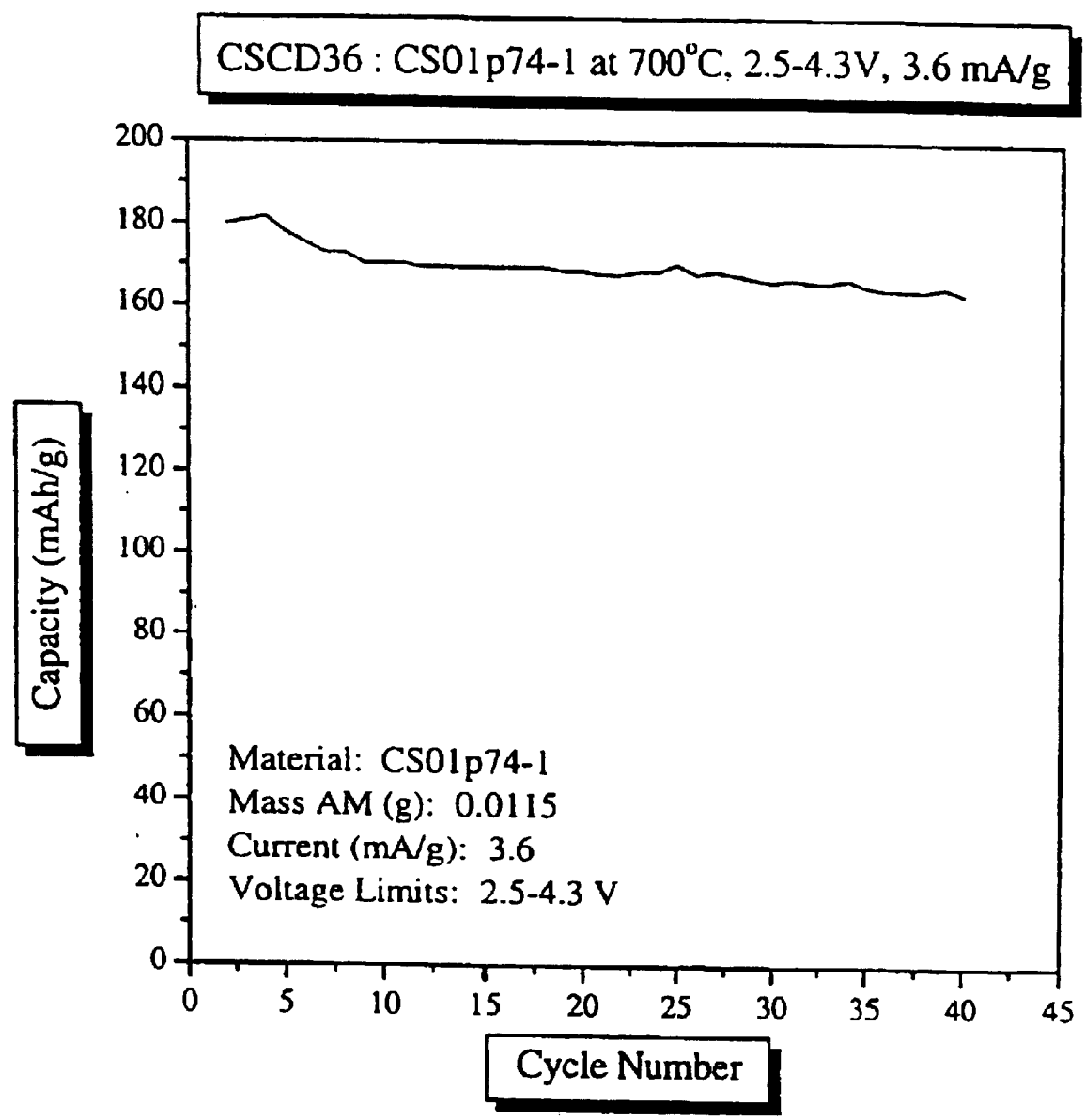
Figure 4:
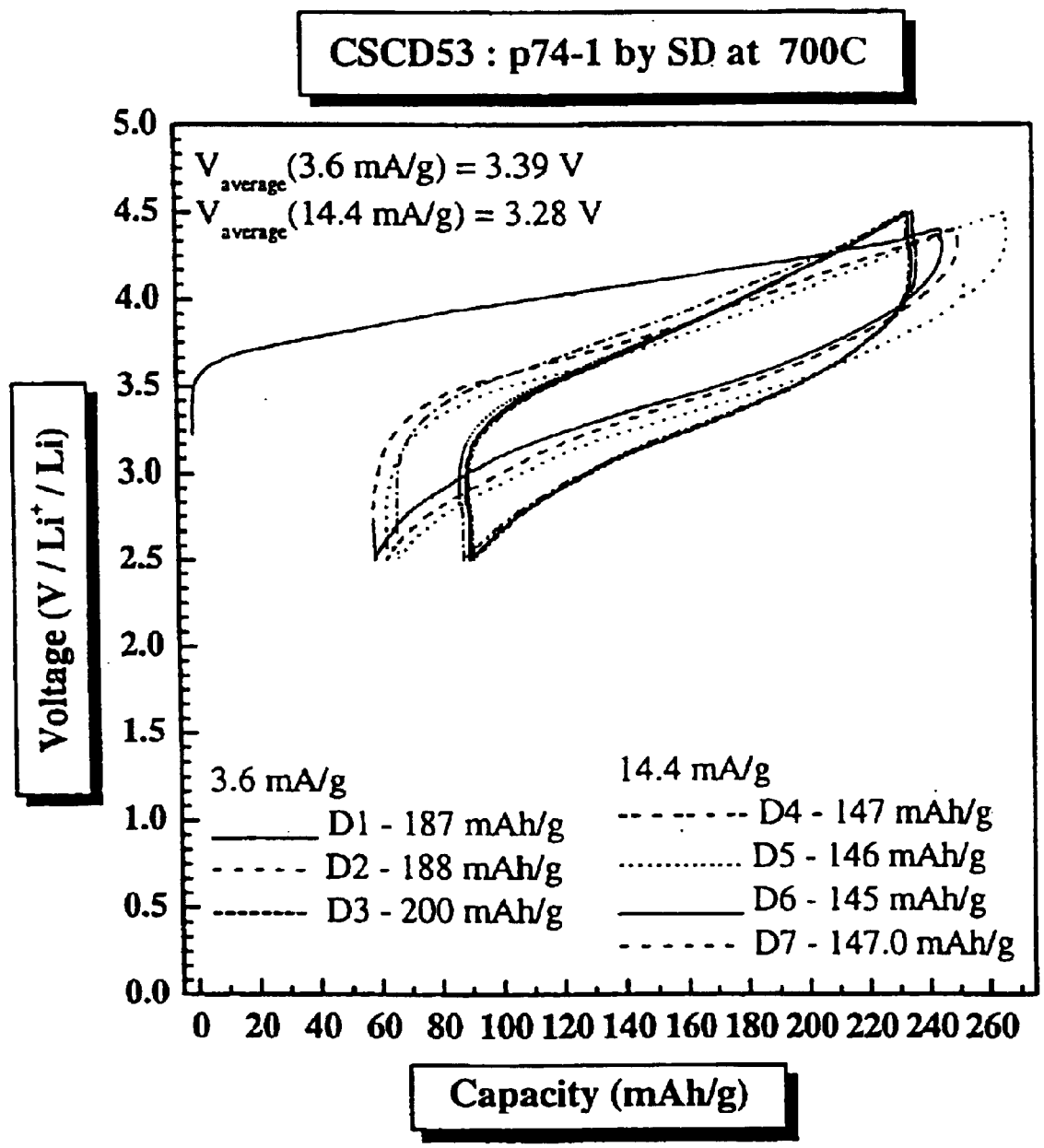
Figure 5:
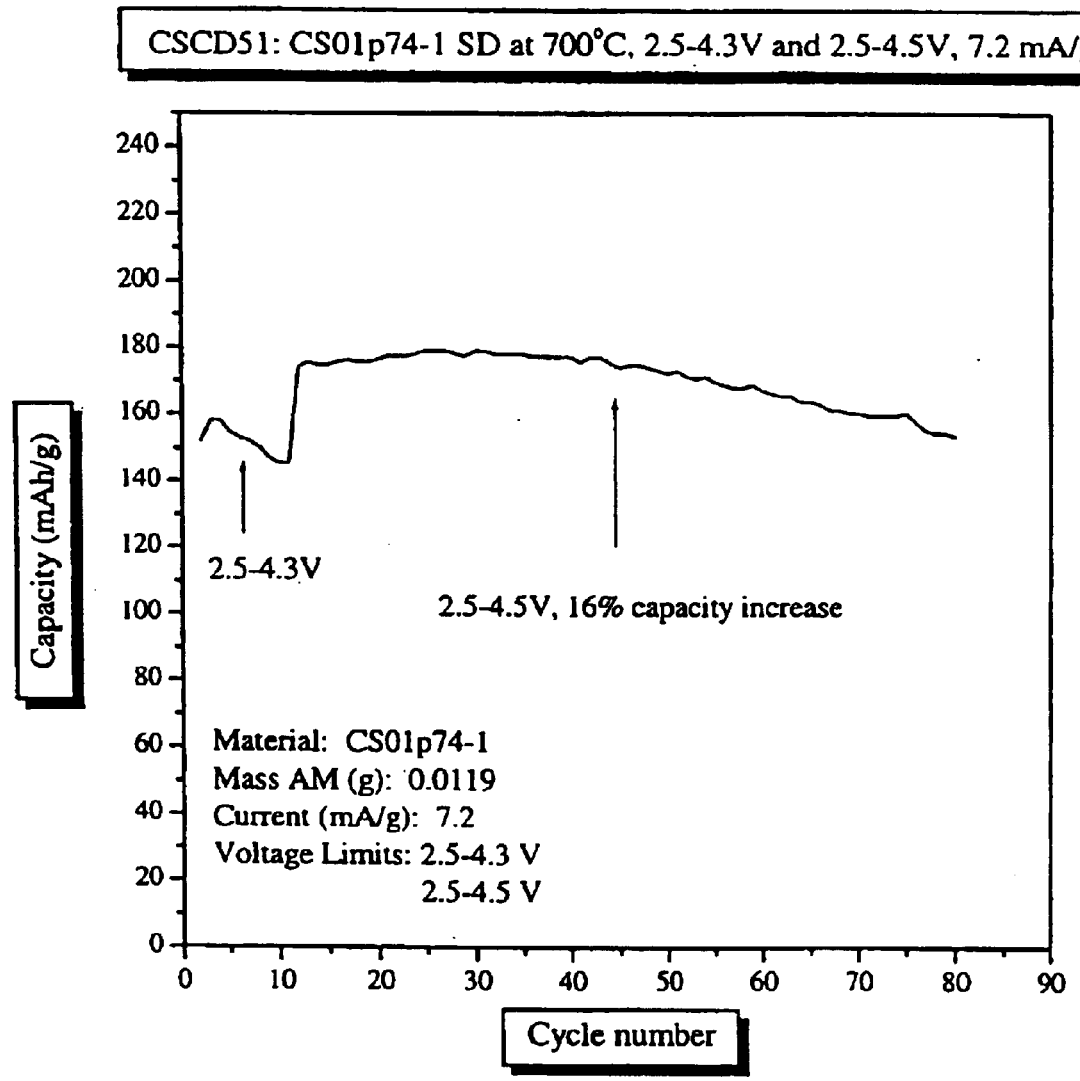
Figure 6:
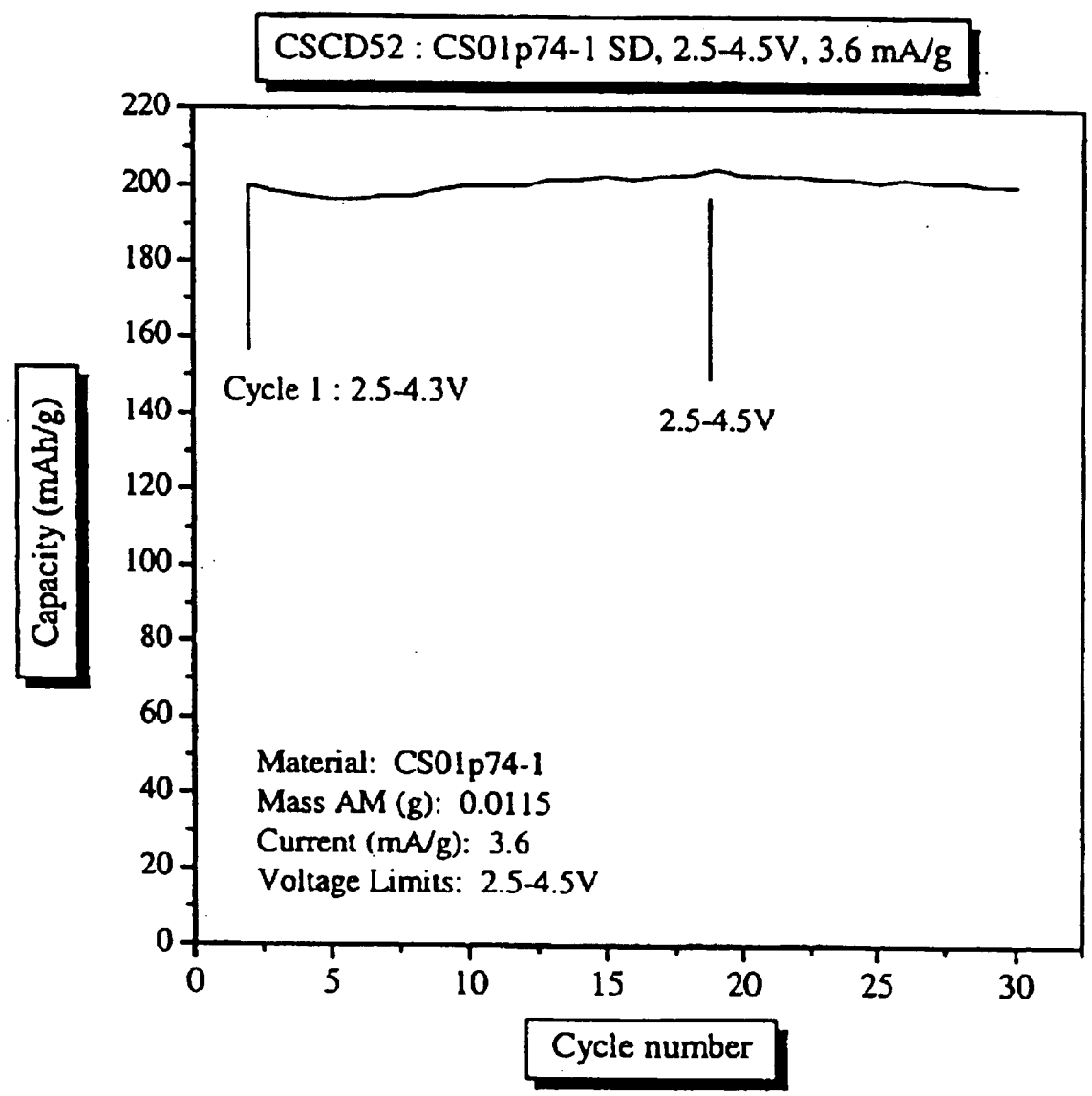

The voltage profile for the first seven cycles of a cell cycled at 3.6 mA/g between 2.5 and 4.3 volts is shown in FIG. 2. The initial discharge capacity was 180 mAh/g and the average output voltage was 3.41 volts. A plot of discharge capacity versus cycle number for this cell is provided in FIG. 3. Another cell cycled between 2.5 and 4.5 volts produced discharge capacities of 187 to 200 mAh/g at 3.6 mA/g and 145 to 147 mAh/g at 14.4 mA/g as shown in FIG. 4. FIG. 5 is a plot of capacity versus cycle number for a similar cell cycled at 7.2 mA/g from 2.5 volts to initially 4.3 volts and later 4.5 volts. This cell demonstrated only moderate capacity fade over 75 cycles and discharge capacities of up to 179 mAh/g. FIG. 6 shows the discharge capacity versus cycle number for a cell cycled between 2.5 and 4.3 volts for the first cycle and between 2.5 and 4.5 volts for subsequent cycles at 3.6 mA/g. The cell demonstrated very good capacity retention over 30 cycles at discharge capacities over 195 mAh/g.

Figure 7:
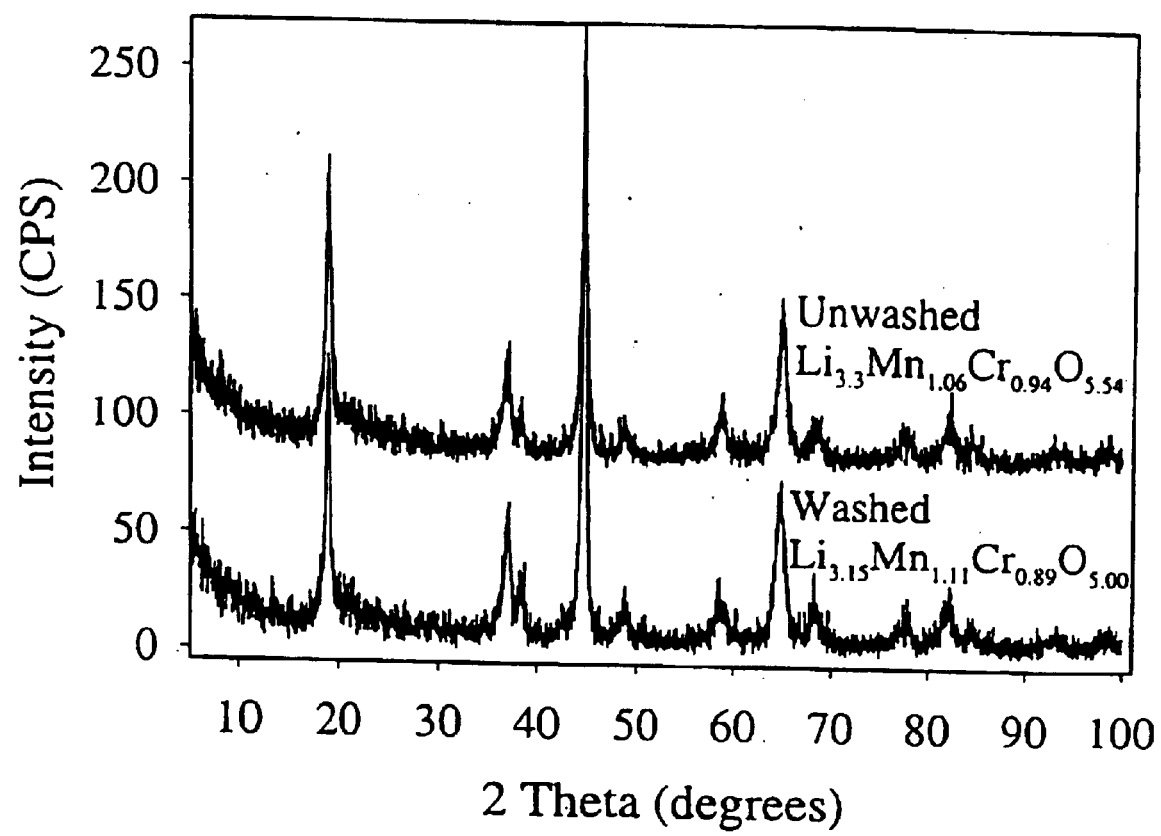
FIG. 7 overlays x-ray diffraction patterns of samples described in example 1.

A portion of the sample was washed with water to remove any soluble residuals and some of this material was cast and tested in coin cells. Atomic absorption analysis of the material after washing corresponded to the composition Li(3.15±0.32)Mn(1.11±0.11)Cr(0.89±0.06)O(5.00±0.31), with the oxygen content estimated by difference. FIG. 7 shows a comparison of the powder x-ray diffraction patterns of the material before and after washing.

Figure 8:
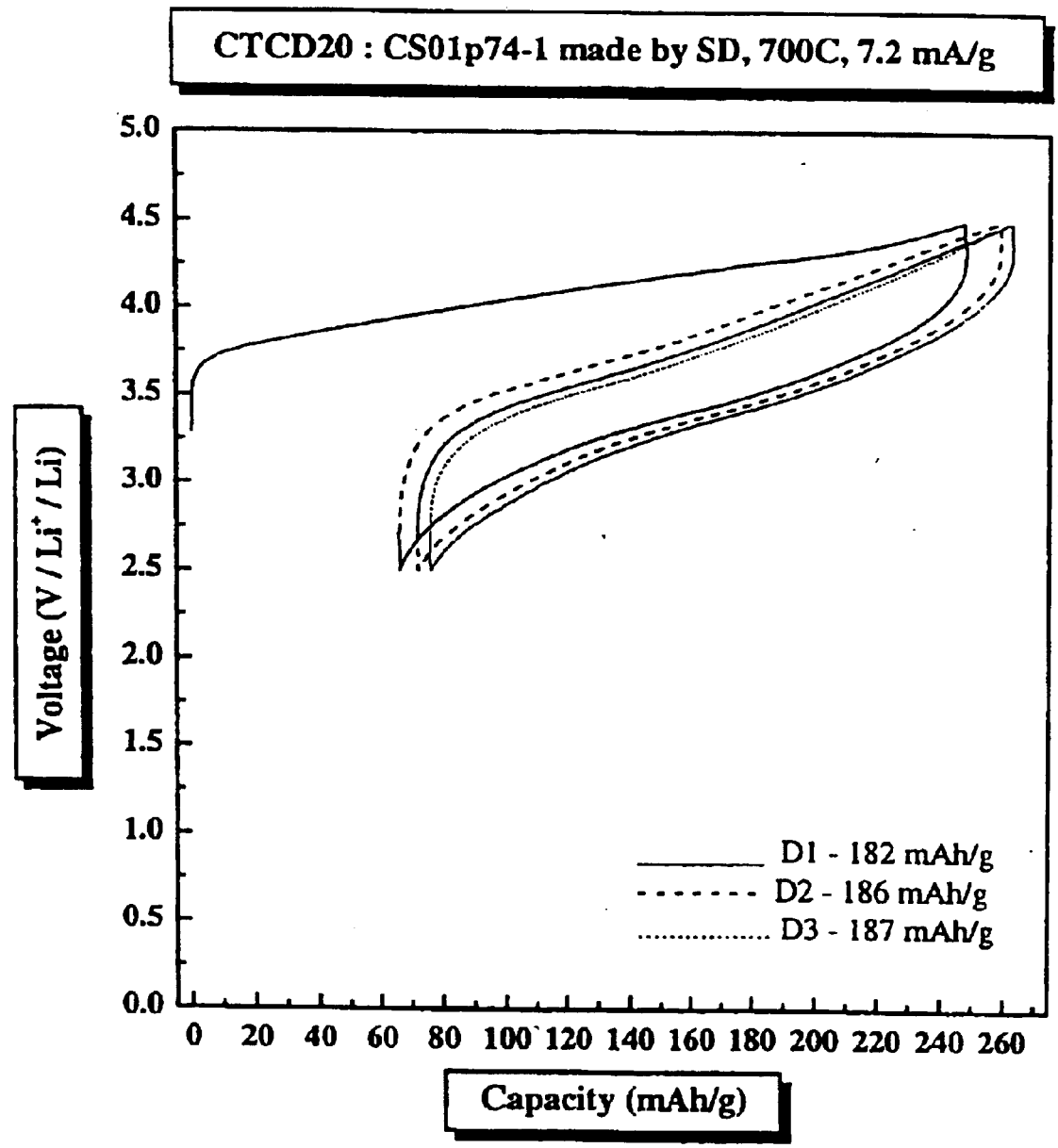
FIGS. 8 and 9 show the voltage profiles of electrochemical cells prepared according to example 1.
Figure 9:
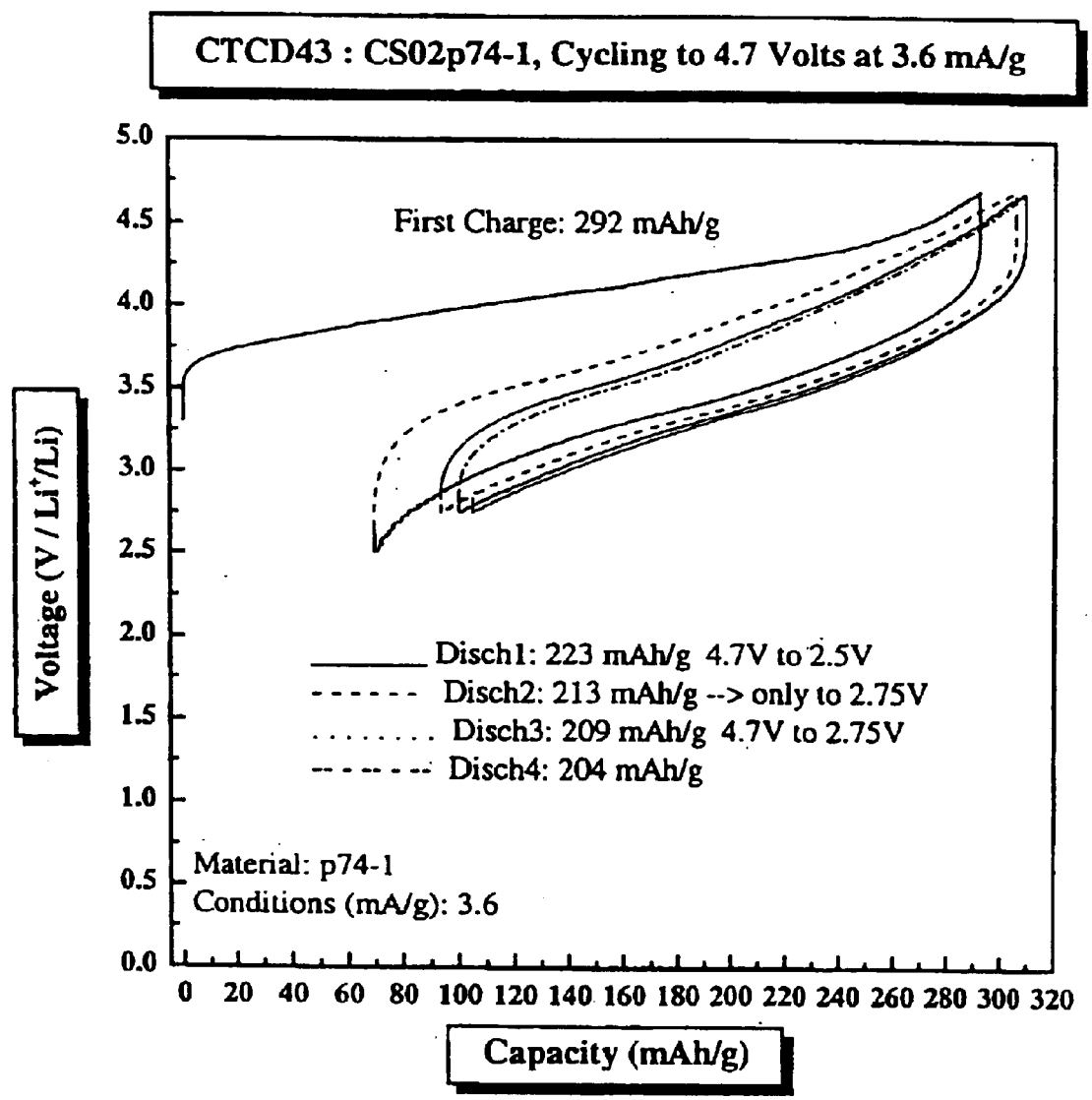
Figure 10:
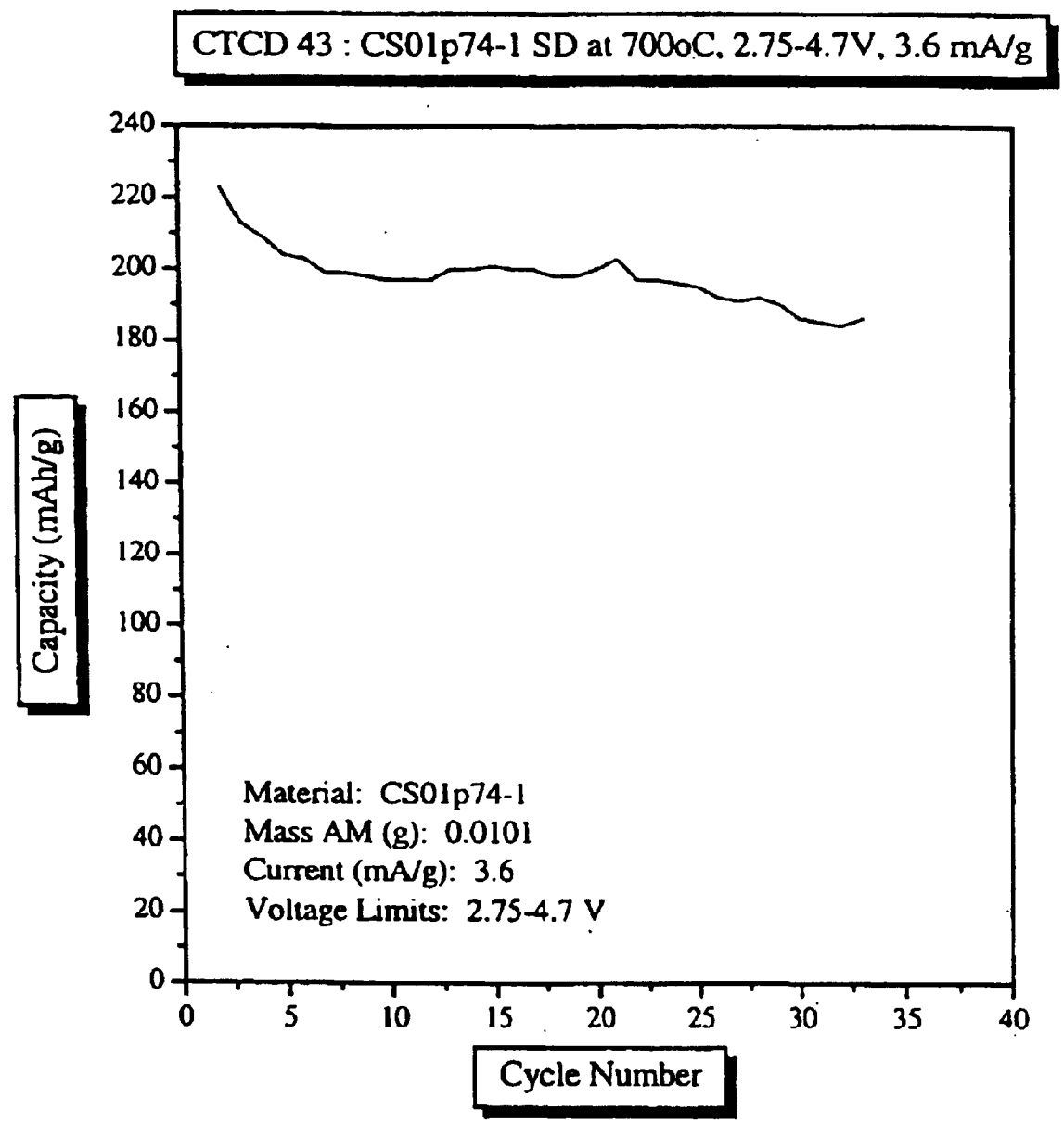
FIG. 10 is a plot of capacity versus cycle number for an electrochemical cell cycled under the conditions described in example 1.

An electrode cast was made of the washed sample in a similar manner as the unwashed sample. The electrode cast of the washed sample contained 0.406 g active material, 0.050 g Super S, 0.054 g graphite and 1.286 g of a 3 weight percent solution of Kynar Flex 2801 in NMP. Electrodes discs were punched from this cast and tested in coin cells in a manner similar to the previous examples. This cast was used in a cell cycled at 7.2 mA/g between 2.5 and 4.5 volts. The cell had a discharge capacity of 182 mAh/g on the first cycle. FIG. 8 shows the capacity and voltage profile of this cell. A voltage versus capacity plot for another cell containing a cathode punched for the same cast is shown in FIG. 9. This cell was cycled at 3.6 mA/g between 2.5 and 4.7 volts on the first cycle and between 2.75 and 4.7 volts for subsequent cycles. FIG. 10 is a plot of discharge capacity versus cycle number for the same cell. As can be seen in the figure this cell could be cycled to 4.7 volts over 30 cycles without severe capacity loss and retained discharge capacities in excess of 185 mAh/g.

The atomic absorption analyses of both the washed and unwashed samples verify that they contain greater amounts of lithium and oxygen that $Li_2Cr_yMn_{2-y}O_4$ phases. Comparison of the powder x-ray diffraction patterns of these samples to that of $LiCrO_2$ clearly indicates a smaller crystallographic unit cell. Cycling to 4.7V has proven successful using either $LiPF_6$ or $LiBF_4$ electrolyte solutions.

EXAMPLE 2

Figure 11:
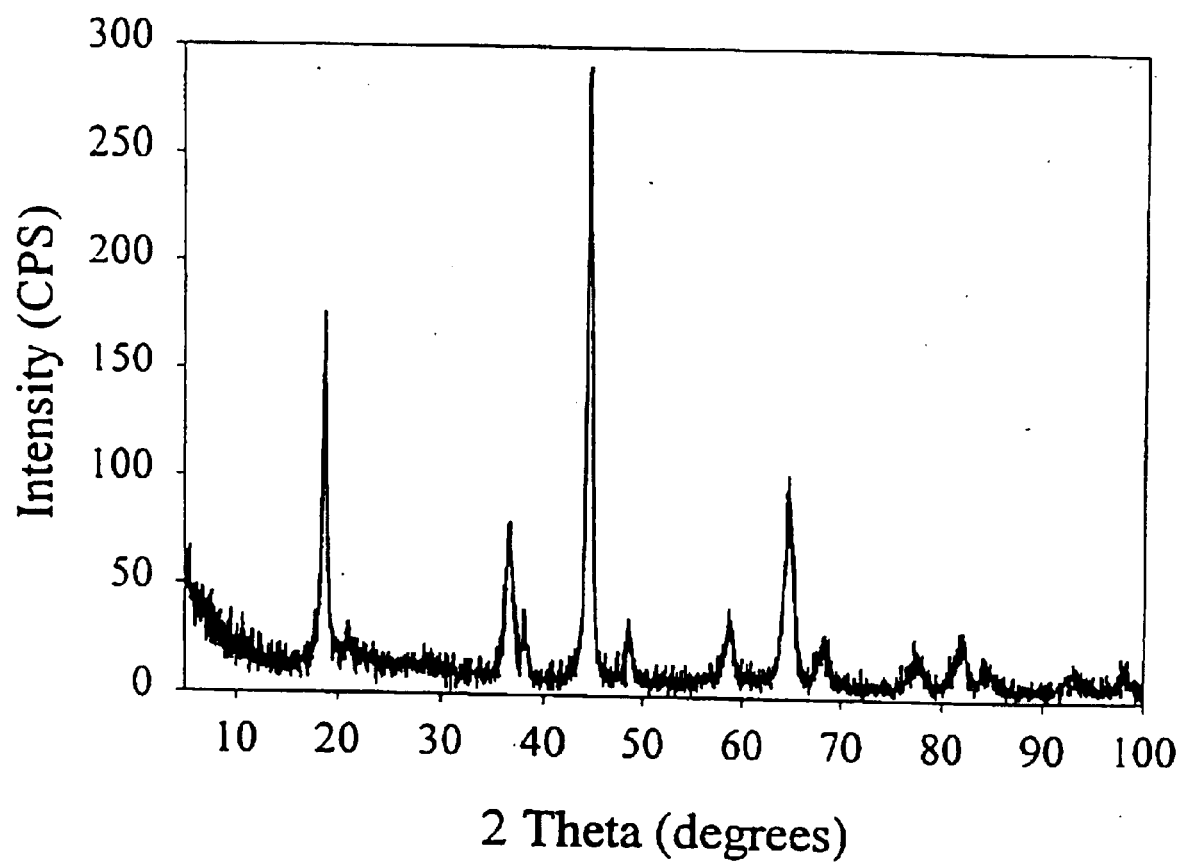
FIG. 11 is a x-ray diffraction pattern for the sample of example 2.

In this example, an intimate mixture of manganese and chromium salts was prepared by spray drying a 1 liter solution containing 24.677 g of manganese acetate (Aldrich) and 22.075 g of chromium acetate hydroxide (Aldrich). The metal salts were calcined at 475° C. for 4 hours in air. A quantity of the product of the calcination, 4.014 g, was combined with 20.85 ml of a 4 M aqueous solution of LiOH (Anachemia) as a slurry. The mixture was slowly heated to 450° C. in air and held at that temperature for 2 hours. After cooling the sample was ground by hand with a mortar and pestle and then transferred to an alumina boat for a final heat treatment in a flow of argon at 700° C. for 4 hours. The x-ray diffraction pattern of this sample is shown in FIG. 11. A Rietveld refinement of the diffraction pattern calculated the crystallographic unit cell dimensions to be 2.876 Å in the a and b directions and 14.25 Å in the c direction of a hexagonal symmetry cell. The volume of the crystallographic unit cell is calculated to be 102.1 cubic Angstroms, significantly lower that that of $LiCrO_2$ at 104.9 cubic Angstroms. A chemical analysis by atomic absorption predicted a composition of Li2.95Mn0.91 Cr1.09O4.11 for this sample.

Figure 12:
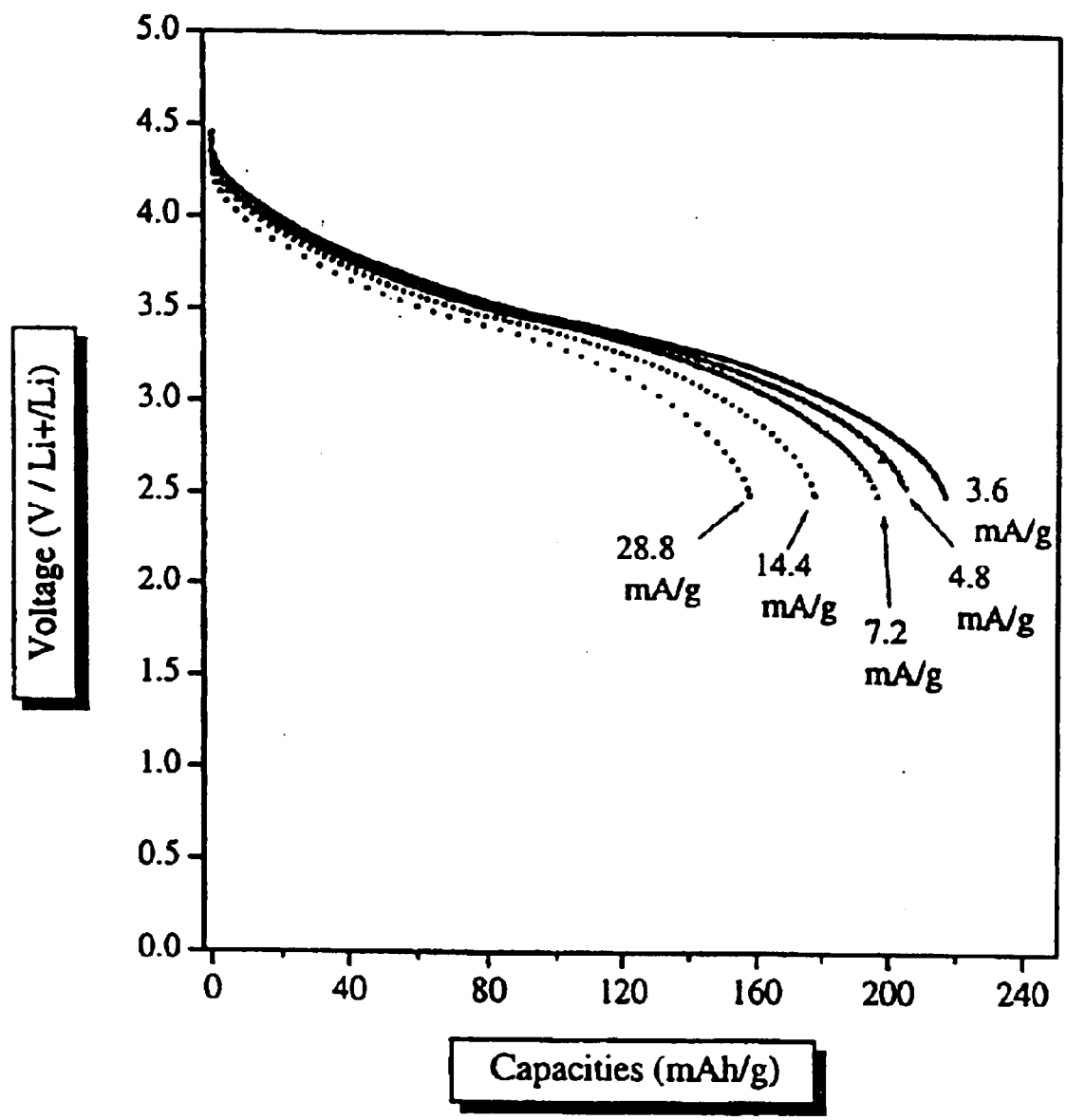
FIG. 12 provides the discharge voltage profiles of cells assembled and tested as described in example 2.
Figure 13:
FIG. 13 is a SEM micrograph of a sample prepared according to example 2.
Figure 13:
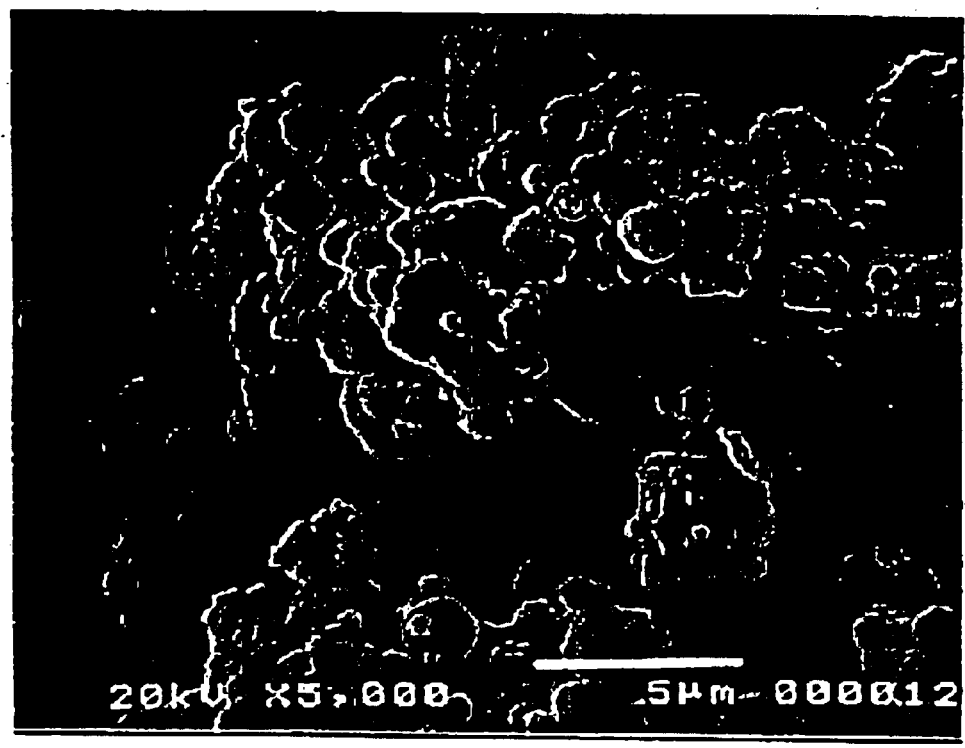

After grinding again by hand a portion of the material was formed into an electrode cast by combining 0.465 g of active material with 0.051 g of Super S carbon black, 0.052 g of graphite (Lonza KS4) and 1.131 g of a 4 weight percent solution of Kynar Flex 2801 in NMP. Cathode discs cut from this cast were tested in coin cells similar to those described in the prior examples. FIG. 12 shows the voltage versus capacity profiles for cells with these cathodes cycled at the indicated current densities. The charge and discharge capacities at the $1^{st}$, $15^{th}$, $30^{th}$ and $50^{th}$ cycles for cells cycled at various current densities are tabulated in table 1. Two SEM micrographs of the product from the spray-drying procedure are provided in FIG. 13.

TABLE 1

Charge and discharge capacities for the $1^{st}$, $15^{th}$, $30^{th}$ and $50^{th}$ 5 cycle of cells cycled between 2.5 and 4.5 volts at the indicated current densities.

| Cell | Active Mass | Current mA/g | Ch/Dis Cap 1st Mah/g | Ch/Dis Cap 15th mAh/g | Ch/Dis Cap 30th mAh/g | Ch/Dis Cap 50th mAh/g |
|---|---|---|---|---|---|---|
| CTCD56 | 0.0171 | 3.6 | 280/216 | 213/207 | | |
| CTCD57 | 0.0168 | 4.8 | 270/205 | 202/196 | | |
| CTCD58 | 0.0171 | 7.2 | 260/198 | 192/190 | 201/196 | |
| CTCD59 | 0.0171 | 7.2 | 265/187 | 196/181 | 204/188 | |
| CTCD60 | 0.0162 | 14.4 | 249/178 | 177/168 | 176/162 | 176/166 |
| CTCD61 | 0.0174 | 14.4 | 247/177 | 170/163 | 168/160 | 162/154 |
| CTCD62 | 0.0175 | 28.8 | 227/159 | 145/143 | 147/144 | 141/136 |
| CTCD63 | 0.0174 | 14.4 | 245/183 | 171/170 | 169/168 | 160/159 |

EXAMPLE 3

The effect of increasing the concentration of Cr and Mn metals, for 20 stoichiometries ranging from $Li_xMn_{1.5}Cr_{0.5}O_{4+z}$ to $Li_xMn_{0.5}Cr_{1.5}O_{4+z}$, was studied using the spray drying process.

Solutions of varied concentration of $Mn(CH_3CO_2)_2$ and $Cr_3(OH)_2(CH_3CO_2)_7$ were prepared, spray dried in a commercial Buchi spray drier and then thermally decomposed at 450° C. The dried oxides were mixed with a 4 M solution of LiOH in a ratio of 1 g of oxide to 5.2 ml of LiOH solution. The resulting slurry was dried and calcined in air by slowly heating it to 450° C. and holding it at 450° C. for 2 hours. The material was ground by hand with an agate mortar and pestle and transferred to an alumina crucible before heating at 700° C. for 4 to 5 hours under a blanket of flowing argon gas. The target and chemically analyzed compositions are listed in tables 2 and 3 for the chromium-rich and manganese-rich samples respectively. The chemical analysis was done by atomic absorption and the oxygen compositions are calculated by difference. The uncertainty in the chemical analysis by atomic absorption was approximately 5 to 8 mole %. The discharge capacities of cells cycled between 2.5 and 4.5 volts at a current density of 7.2 mA/g are listed in tables 2 and 3 for the $1^{st}$, $10^{th}$ and $20^{th}$ cycles.

Figure 14:
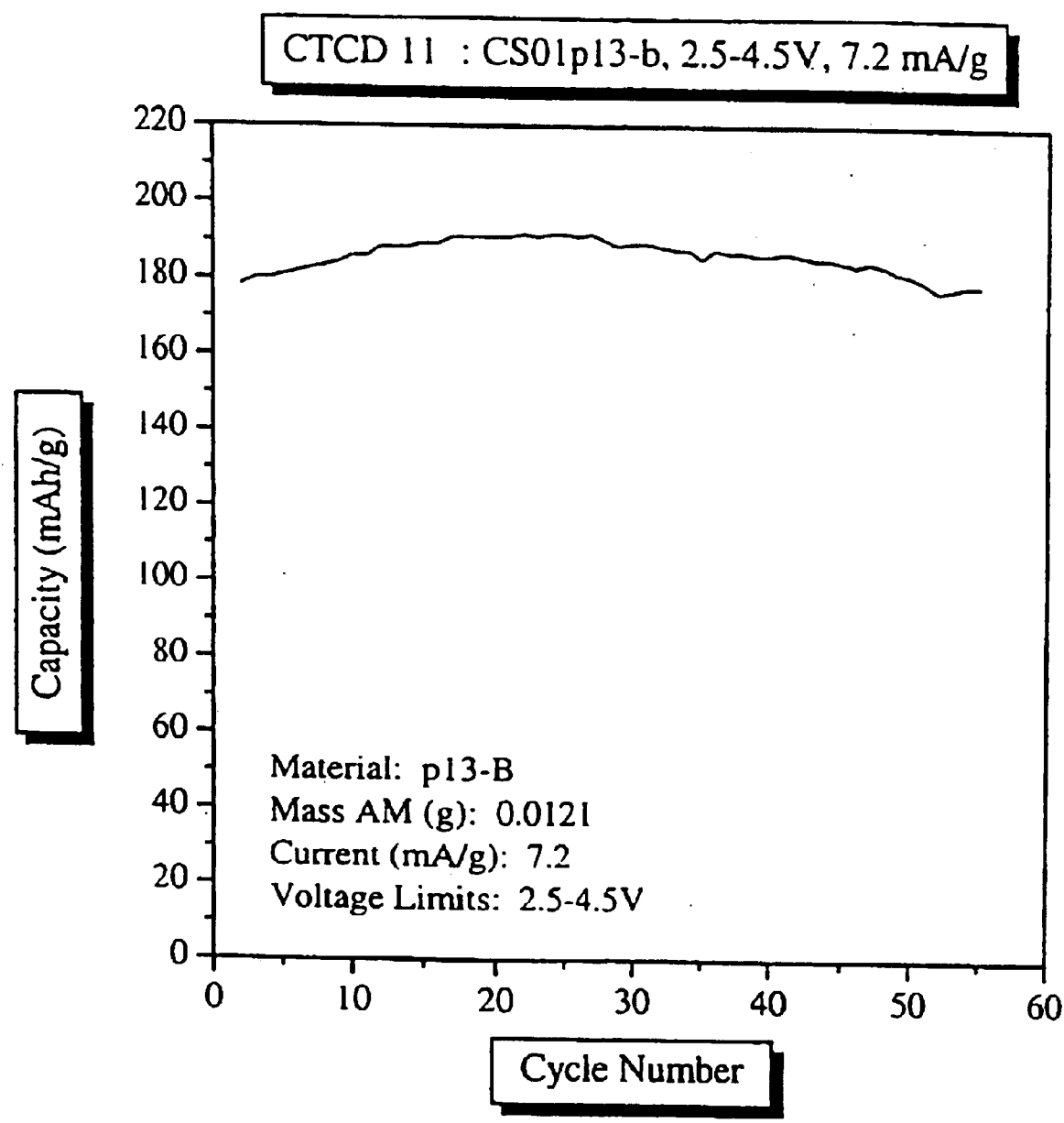
FIG. 14 is a plot of specific capacity for a cell prepared and tested as described in example 3.
Figure 15:
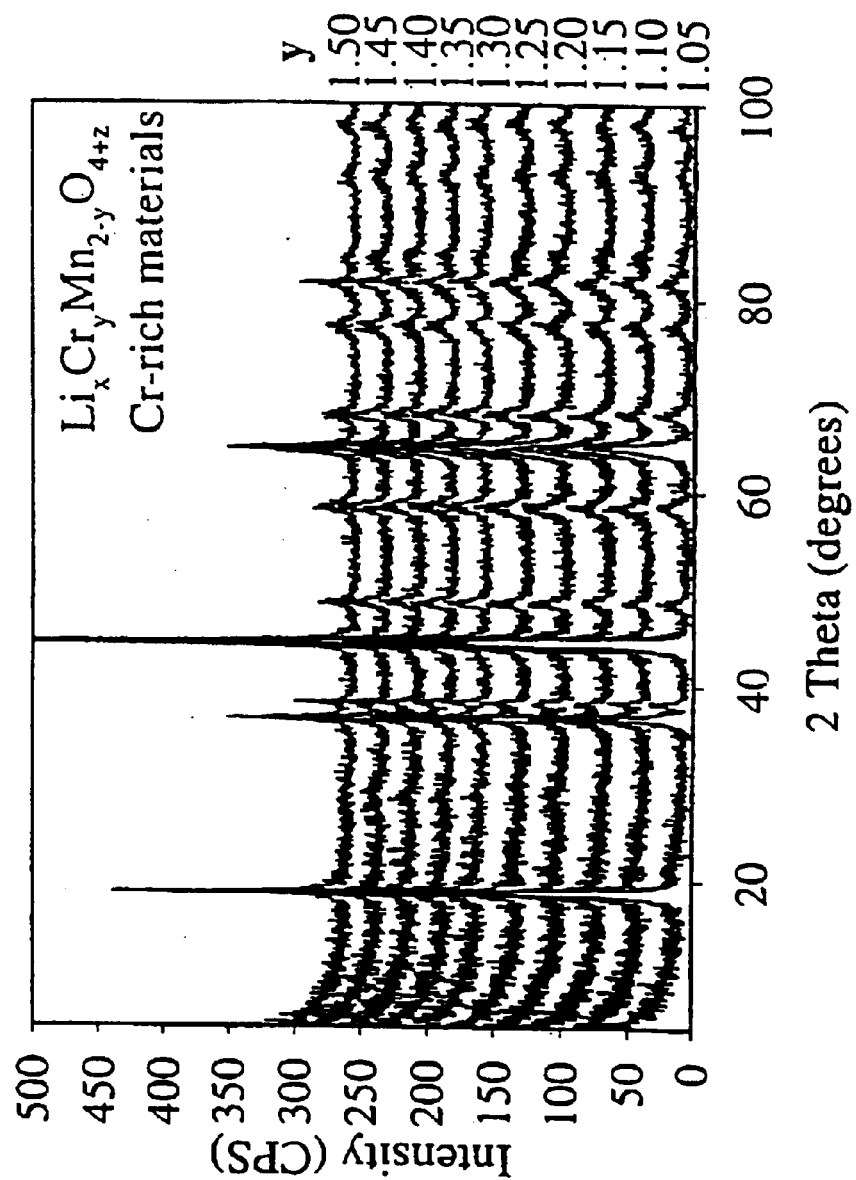
FIGS. 15–16 are overlays of x-ray diffraction patterns of the samples prepared according to example 3.

On cycling the phases with a higher concentration of Cr (designated as chromium-rich) first discharge capacities of up to 221 mAh/g were observed. The cell with a cathode of composition, $Li_{3.7}Cr_{1.05}Mn_{0.95}O_{5.4}$, demonstrated a stable capacity near 180 mAh/g over 50 cycles at 7.2 mA/g as shown in FIG. 14. Cells with cathodes of compositions $Li_{3.1}Cr_{1.10}Mn_{0.90}O_{5.1}$, $Li_{3.3}Cr_{1.20}Mn_{0.80}O_{4.9}$ and $Li_{2.8}Cr_{1.46}Mn_{0.54}O_{5.2}$ also showed very stable capacities of 180 and 170 mAh/g at the same current density. The x-ray diffraction patterns of chromium-rich samples A to J are overlaid in FIG. 15.

TABLE 2

Compositions and discharge capacities of Cr-rich $Li_xCr_yMn_{2-y}O_{4+z}$

| Sample | Target Cr/Mn | Composition analysis atomic absorption | Li/O | Discharge Capacity (mAh/g) Cycle: 1, 10, 20 |
|---|---|---|---|---|
| A | 1.05/0.95 | $Li_{2.9}Mn_{0.99}Cr_{1.01}O_{5.4}$ | 0.539 | 152, 158, 165 |
| B | 1.10/0.90 | $Li_{3.1}Mn_{0.95}Cr_{1.05}O_{5.4}$ | 0.569 | 179, 186, 191 |
| C | 1.15/0.85 | $Li_{3.1}Mn_{0.90}Cr_{1.10}O_{5.1}$ | 0.604 | 171, 178, 182 |
| D | 1.20/0.80 | $Li_{3.4}Mn_{0.85}Cr_{1.15}O_{5.7}$ | 0.584 | 189, 153, 133 |
| E | 1.25/0.75 | $Li_{3.3}Mn_{0.80}Cr_{1.20}O_{4.9}$ | 0.683 | 215, 180, 180 |
| F | 1.30/0.70 | $Li_{3.1}Mn_{0.75}Cr_{1.25}O_{5.4}$ | 0.571 | 188, 132, 113 |
| G | 1.35/0.65 | $Li_{3.2}Mn_{0.69}Cr_{1.31}O_{5.1}$ | 0.623 | 193, 135, 113 |
| H | 1.40/0.60 | $Li_{3.3}Mn_{0.66}Cr_{1.34}O_{5.9}$ | 0.564 | 197, 143, 150 |
| I | 1.45/0.55 | $Li_{3.1}Mn_{0.59}Cr_{1.41}O_{5.0}$ | 0.619 | 180, 125, 120 |
| J | 1.50/0.50 | $Li_{2.8}Mn_{0.54}Cr_{1.46}O_{5.2}$ | 0.550 | 221, 162, 171 |

Figure 16:
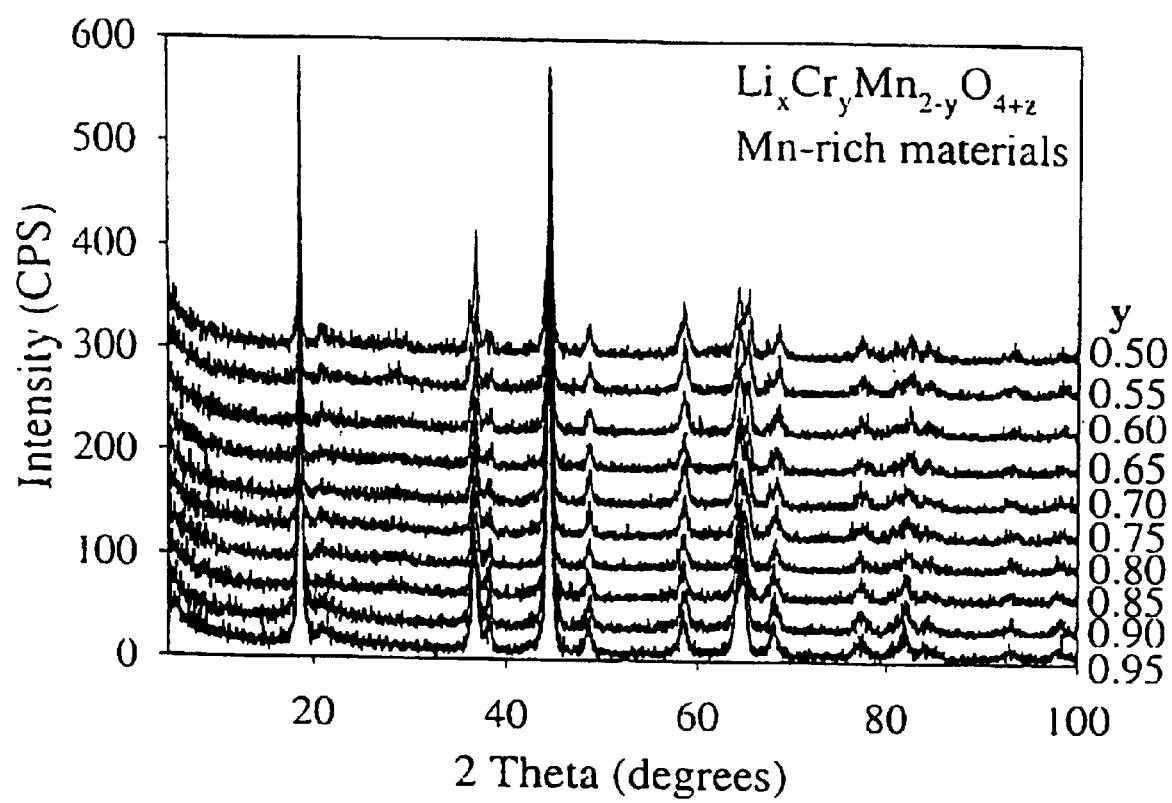

The x-ray diffraction patterns of the manganese-rich series of samples A to J are shown in FIG. 16. The discharge capacities for the $1^{st}$, $10^{th}$ and $20^{th}$ cycles of cells with cathodes based on the manganese-rich materials cycled between 2.5 and 4.5 volts at a current density of 7.2 mA/g are listed in table 3. The manganese-rich materials exhibited very stable discharge capacities over the first twenty cycles. A cell with a cathode of composition $Li_{3.1}Mn_{1.07}Cr_{0.93}O_{6.6}$ had a capacity of 175 mAh/g on the $20^{th}$ cycle while those of compositions $Li_{2.8}Mn_{1.10}Cr_{0.90}O_{4.5}$ and $Li_{3.1}Mn_{1.15}Cr_{0.85}O_{4.7}$ had capacities of 145 and 150 mAh/g by the $20^{th}$ cycle.

TABLE 3

Compositions and discharge capacities of Mn-rich $Li_xCr_yMn_{2-y}O_{4+z}$

| Sample | Target Mn/Cr | Composition analysis atomic absorption | Li/O | Discharge Capacity (mAh/g) Cycle: 1, 10, 20 |
|---|---|---|---|---|
| A | 1.05/0.95 | $Li_{2.8}Mn_{1.10}Cr_{0.90}O_{4.5}$ | 0.632 | 147, 141, 145 |
| B | 1.10/0.90 | $Li_{3.1}Mn_{1.07}Cr_{0.93}O_{6.6}$ | 0.463 | 148, 169, 175 |
| C | 1.15/0.85 | $Li_{3.1}Mn_{1.15}Cr_{0.85}O_{4.7}$ | 0.653 | 141, 144, 150 |
| D | 1.20/0.80 | $Li_{3.2}Mn_{1.17}Cr_{0.83}O_{4.5}$ | 0.708 | 100, 117, 126 |

TABLE 3-continued

Compositions and discharge capacities of Mn-rich $Li_xCr_yMn_{2-y}O_{4+z}$

| Sample | Target Mn/Cr | Composition analysis atomic absorption | Li/O | Discharge Capacity (mAh/g) Cycle: 1, 10, 20 |
|---|---|---|---|---|
| E | 1.25/0.75 | $Li_{3.3}Mn_{1.22}Cr_{0.78}O_{4.6}$ | 0.720 | 89, 96, 101 |
| F | 1.30/0.70 | $Li_{2.8}Mn_{1.30}Cr_{0.70}O_{4.9}$ | 0.575 | 89, 115, 118 |
| G | 1.35/0.65 | $Li_{2.9}Mn_{1.36}Cr_{0.64}O_{4.9}$ | 0.591 | 122, 130, 132 |
| H | 1.40/0.60 | $Li_{3.0}Mn_{1.40}Cr_{0.60}O_{5.3}$ | 0.552 | 87, 102, 108 |
| I | 1.45/0.55 | $Li_{3.0}Mn_{1.48}Cr_{0.54}O_{5.4}$ | 0.550 | 87, 121, 108 |
| J | 1.50/0.50 | $Li_{2.9}Mn_{1.51}Cr_{0.49}O_{5.0}$ | 0.582 | 128, 122, 120 |

EXAMPLE 4

Figure 17:
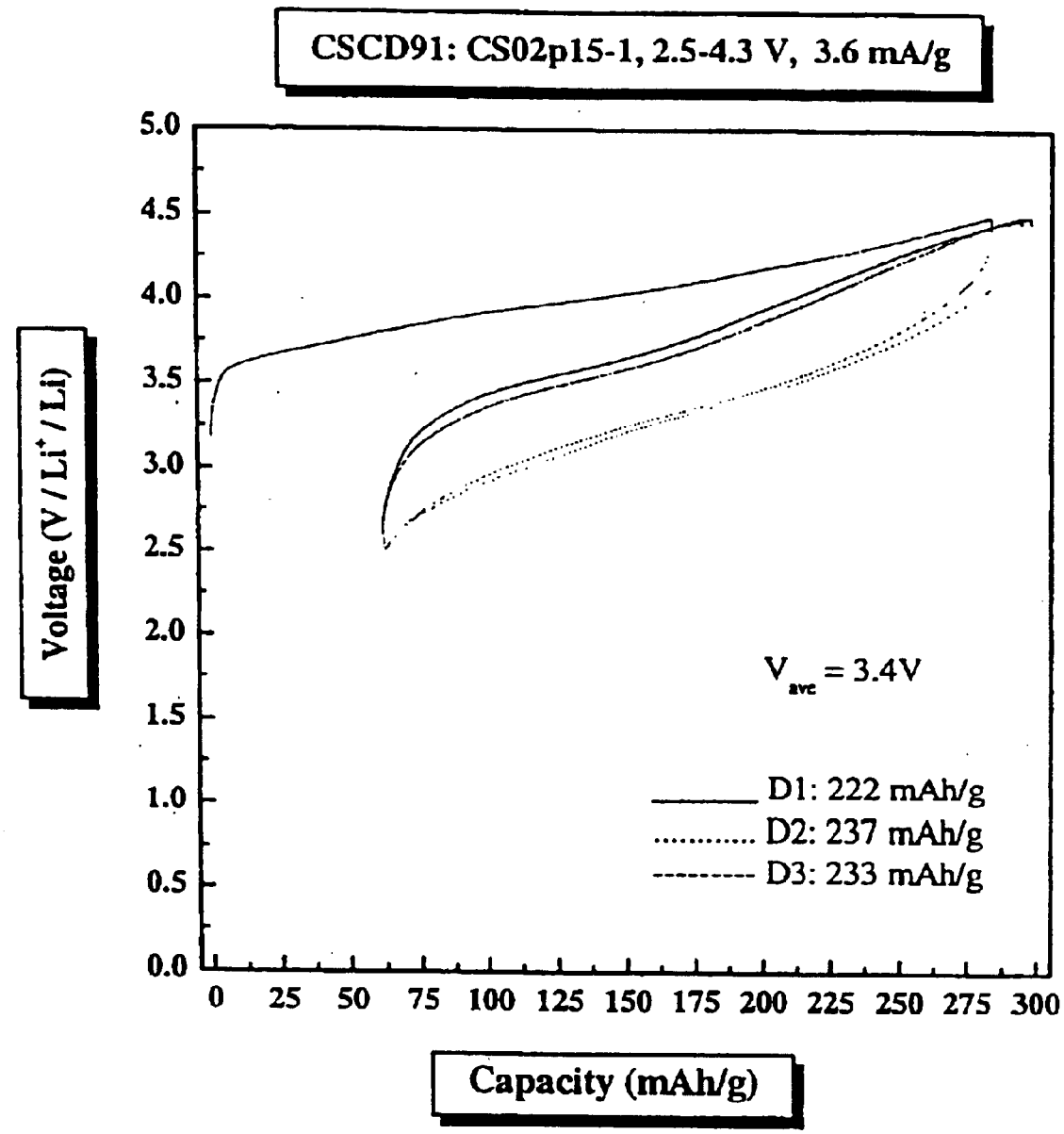
FIGS. 17–20 show specific capacities as a function of either voltage or cycle number for electrochemical cells prepared ant tested according to example 4.
Figure 18:
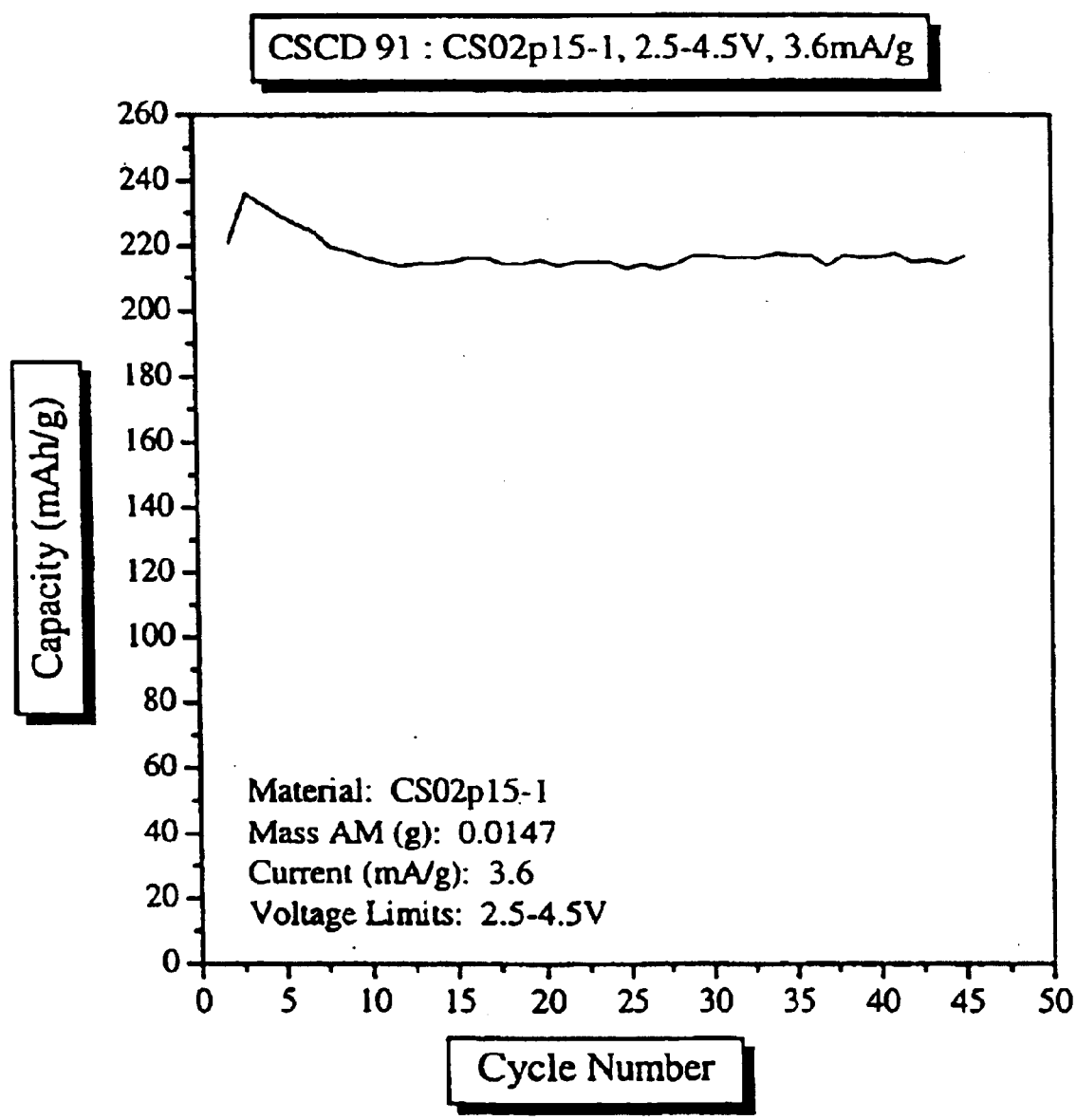
Figure 19:
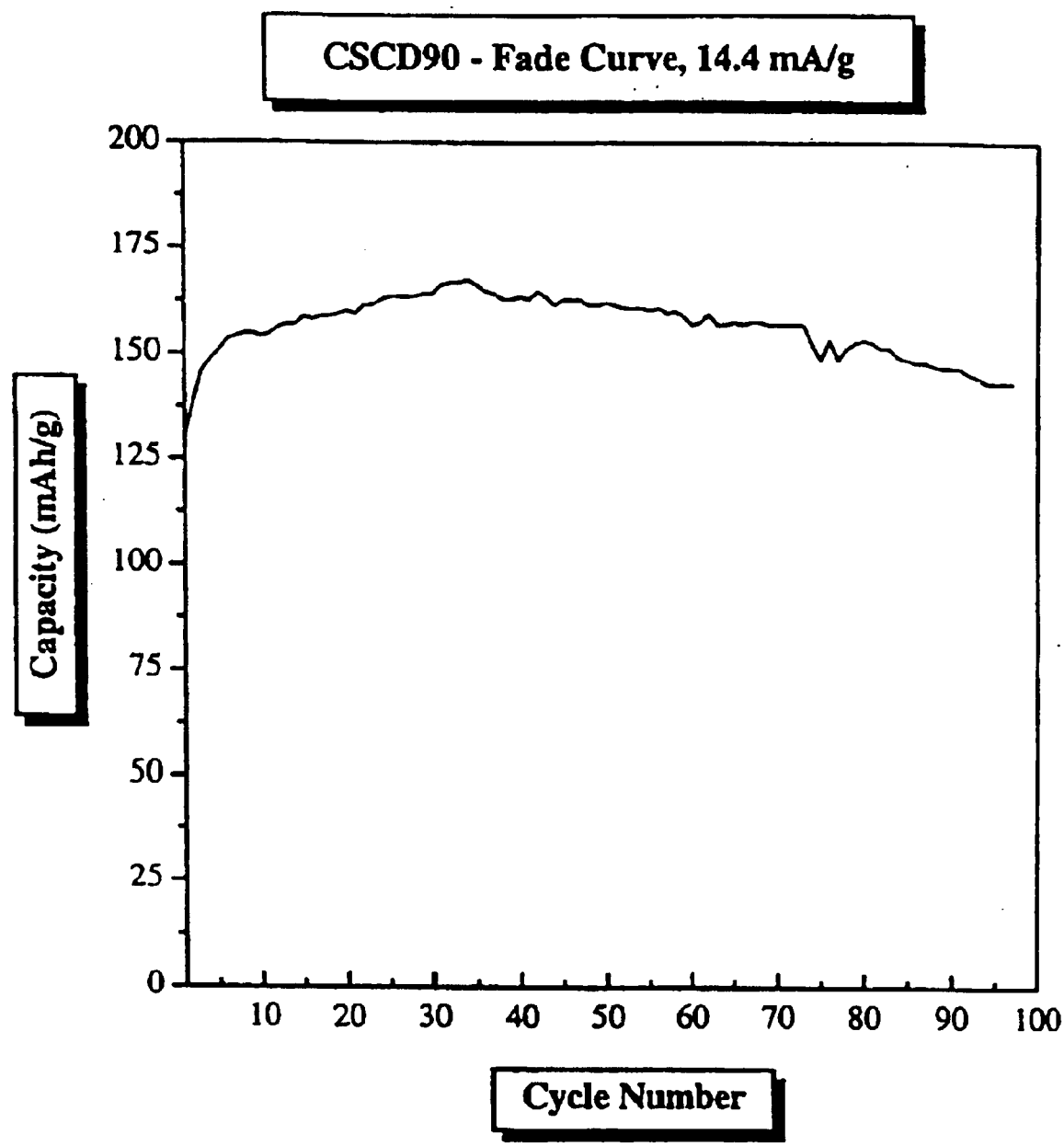
Figure 20:
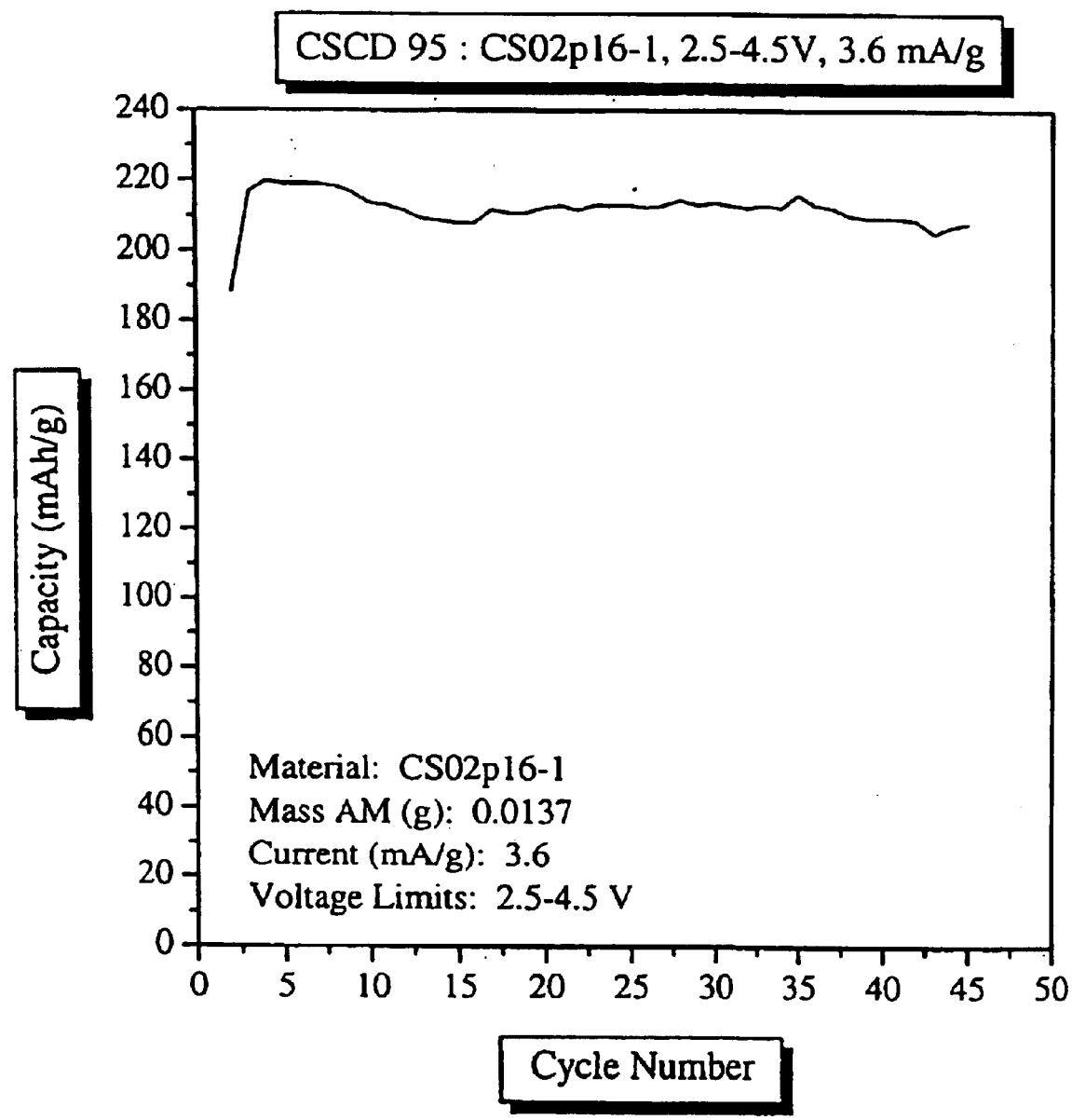

The effect of increasing the lithium content was studied using the spray-drying procedure. Two samples were prepared in as in examples 1 and 2 except that the ratio of lithium hydroxide solution to calcined metal salts was increased. Atomic absorption analysis of the first and second of these samples determined the compositions to be $Li_{3.48}Mn_{0.96}Cr_{1.04}O_{4.80}$ and $Li_{3.61}Mn_{0.97}Cr_{1.03}O_{5.49}$ respectively. These samples were formed into electrodes and electrochemically evaluated in coin cells as in the previous examples. FIG. 17 is a plot of voltage versus capacity for the first of these samples for the first three cycles of a cell cycled between 2.5 and 4.5 volts at 3.6 mA/g. The discharge capacities of the first three cycles were 222, 237 and 233 mAh/g of active cathode material. FIG. 18 is a plot of discharge capacity versus cycle number for the same cell. As can be seen in the figure a capacity near 215 mAh/g was sustained for more than 40 cycles. The same sample was also evaluated in another coin cell at a higher current density. FIG. 19 plots the discharge capacity for the first 100 cycles of a cell cycled between 2.5 and 4.5 volts at a current density of 14.4 mA/g. A discharge capacity near 150 mAh/g was maintained for 100 cycles. The second sample was tested in a similar manner as previous examples. A coin cell with a cathode comprised of the second sample was cycled between 2.5 and 4.5 volts at 3.6 mA/g. The discharge capacity of the first 32 cycles as shown in FIG. 20 is, after the first few cycles, remarkably constant at about 210 mAh/g.

EXAMPLE 5

A process for preparing a Cr—Mn hydroxide through co-precipitation according to present invention is described. An aqueous solution of 2M concentration in chromium nitrate was prepared by adding a specified quantity (according to the targeted Cr/Mn ratio) of manganese nitrate to the solution with the final composition adjusted using water. Slowly pouring caustic alkali aqueous solution containing 6 M sodium hydroxide into the concentrated transition metal nitrate solution caused the co-precipitation of Cr hydroxide and Mn hydroxide. The precipitation was finished when the pH of the mixed solution reached a value of 10.

The Cr—Mn double hydroxide was obtained by filtering the deposits and the rinsing with water. The water rinsing was repeated while continuously measuring the pH value until the pH reached 6–7. The resulting double hydroxide was dried at 100° C. in air. Other precursors such as chromium sulfate and manganese sulfate may also be used as the source of Cr and Mn, respectively. Any combination of metal salts that can make an aqueous solution is usable. Potassium hydroxide, ammonium hydroxide and lithium hydroxide may be used as the caustic alkali solution.

A firing process using a Li compound is described as follows. Lithium hydroxide was used as the Li compound. The Cr—Mn double hydroxide obtained through the co-precipitation method described above was mixed with lithium hydroxide, and the mixture was placed in an alumina crucible and fired in a horizontal tube furnace under a flow of argon gas. The sample was fired for 24 hours at 650–700° C. After the firing the product was gradually cooled to room temperature and milled to a powder to be used as the cathode active material.

After preparing several active materials of various Li/Cr/Mn ratios, each sample was examined by an X-ray diffraction method. The cathodes were prepared by casting and drying a slurry made from 85 wt % active material with 10 wt % acetylene black and 5 wt % polyvinylidene fluoride (PVdF) in NMP. The substrate was Al foil and the diameter of punched cathodes was 10 mm. The anodes were prepared by punching lithium metal film, having the thickness of 0.8 mm and the diameter of 12 mm. The diameters of the electrodes were chosen to fit a commercial coin cell case of the type #2016. These coin cells have a diameter of 20 mm and a height of 1.6 mm.

The cell stack consisted of a three-layer sandwich of the cathode, a cell separator, and a lithium anode. The separator used was a polypropylene film. The electrolyte used was a 50/50 mixture by volume of ethylene carbonate and dimethyl carbonate containing 1M LiPF6. The cells were assembled and crimped in a helium filled glove box. The coin cells were charged and discharged with the current density of 3.6 mA/g and the voltage range was 4.3–2.5V.

Figure 21:
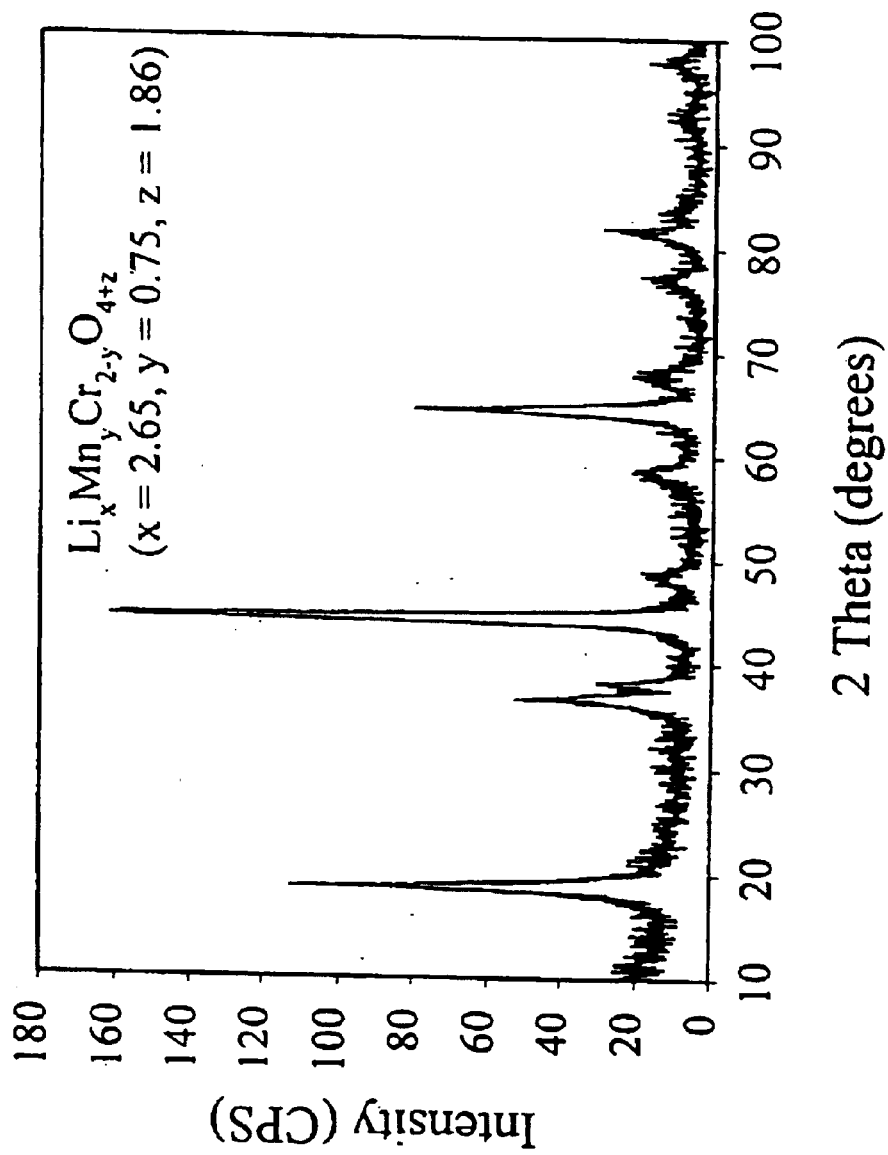
FIG. 21 is a x-ray diffraction pattern of a sample prepared as described in example 5.
Figure 22:
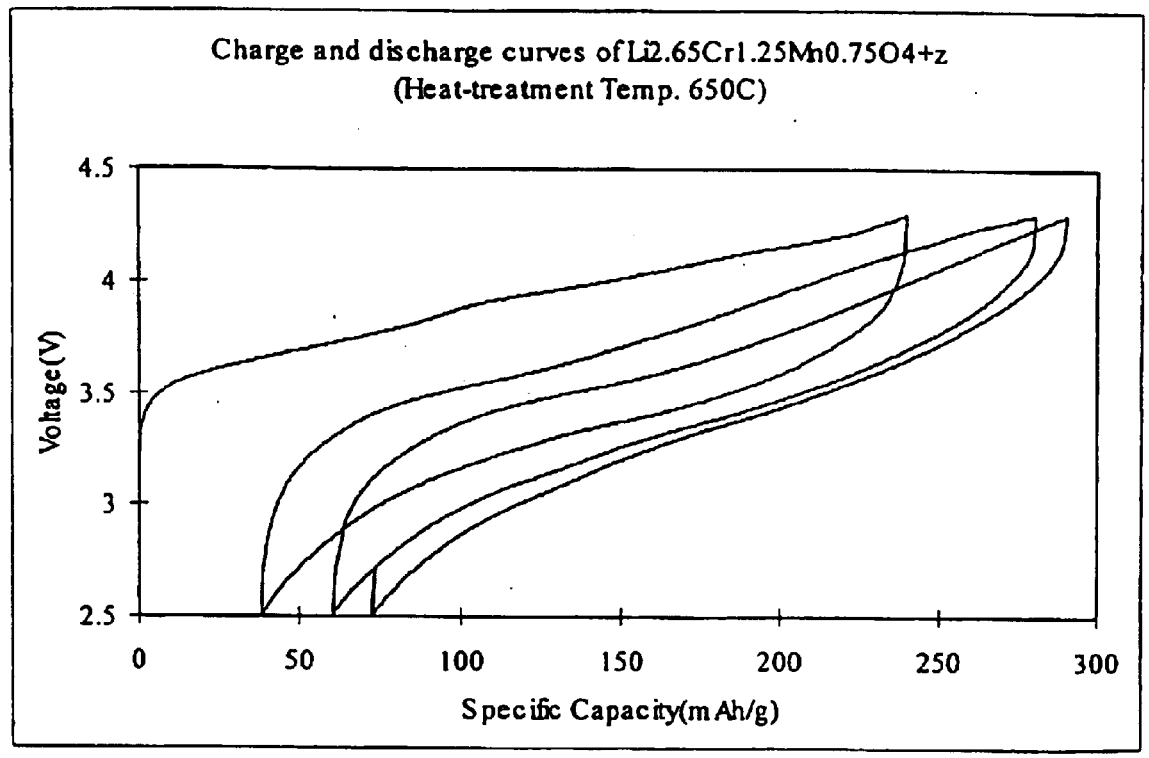
FIG. 22 is a plot of voltage versus capacity for an electrochemical cell assembled and tested according to example 5.

FIG. 21 shows the X-ray diffraction pattern of $Li_xCr_yMn_{2-y}O_{4+z}$ (x=2.65, y=0.75, z=1.86). FIG. 22 shows the charge and discharge curves of active material having above formula. Table 4 represents the results of charge and discharge capacity of several different formulas. The atomic ratios of Li, Cr, and Mn were determined by AA analysis. Oxygen contents were determined by difference. The lattice parameters: a, b and c are in Angstrom units and the unit cell volumes are in units of cubic Angstroms.

TABLE 4

Typical examples from co-precipitation process

| No. | Li mole (x) | Cr mole (y) | Mn mole (2 − y) | O mole (z) | 1st ch/disch (mAh/g) | 5th disch (mAh/g) | Crystal structure (a, c, unit cell volume) |
|---|---|---|---|---|---|---|---|
| 1 | 2.65 | 1.25 | 0.75 | 1.86 | 240.12/ 201.94 | 204.01 | Hexagonal a = 2.885 c = 14.250 v = 102.77 |

TABLE 4-continued

Typical examples from co-precipitation process

| No. | Li mole (x) | Cr mole (y) | Mn mole (2 − y) | O mole (z) | 1st ch/disch (mAh/g) | 5th disch (mAh/g) | Crystal structure (a, c, unit cell volume) |
|---|---|---|---|---|---|---|---|
| 2 | 2.25 | 1.23 | 0.77 | 0.37 | 229.76/ 194.69 | 177.92 | Hexagonal a = 2.891 c = 14.288 v = 103.42 |
| 3 | 3.44 | 1.22 | 0.78 | 1.55 | 278.17/ 204.93 | 191.65 | Hexagonal a = 2.875 c = 14.211 v = 101.78 |
| 4 | 3.09 | 1.34 | 0.66 | 1.79 | 283.81/ 229.69 | 202.19 | Hexagonal a = 2.891 c = 14.216 v = 102.92 |
| 5 | 2.74 | 0.98 | 1.02 | 1.06 | 230.25/ 188.28 | 182.98 | Hexagonal a = 2.893 c = 14.223 v = 103.16 |
| 6* | 2.65 | 1.25 | 0.75 | 1.58 | 241.18/ 147.12 | 133.05 | Hexagonal a = 2.889 c = 14.253 v = 103.03 |
| 7** | 3.01 | 0.99 | 1.01 | 0.12 | 238.76/ 157.39 | 126.80 | Monoclinic a = 5.197 b = 2.861 c = 5.213 β = 112.17* v = 71.79 |
| 8** | 1.98 | 1.20 | 0.80 | 0.07 | 207.07/ 147.76 | 121.17 | Monoclinic a = 5.153 b = 2.871 c = 5.184 β = 111.45* v = 71.41 |
| 9** | 2.04 | 0.51 | 1.49 | 0.13 | 176.00/ 119.93 | 97.37 | Hexagonal a = 2.909 c = 14.442 v = 105.84 |

(*No. 1 sample heated at 800° C., **samples made by solid state process)

EXAMPLE 6

Figure 23:
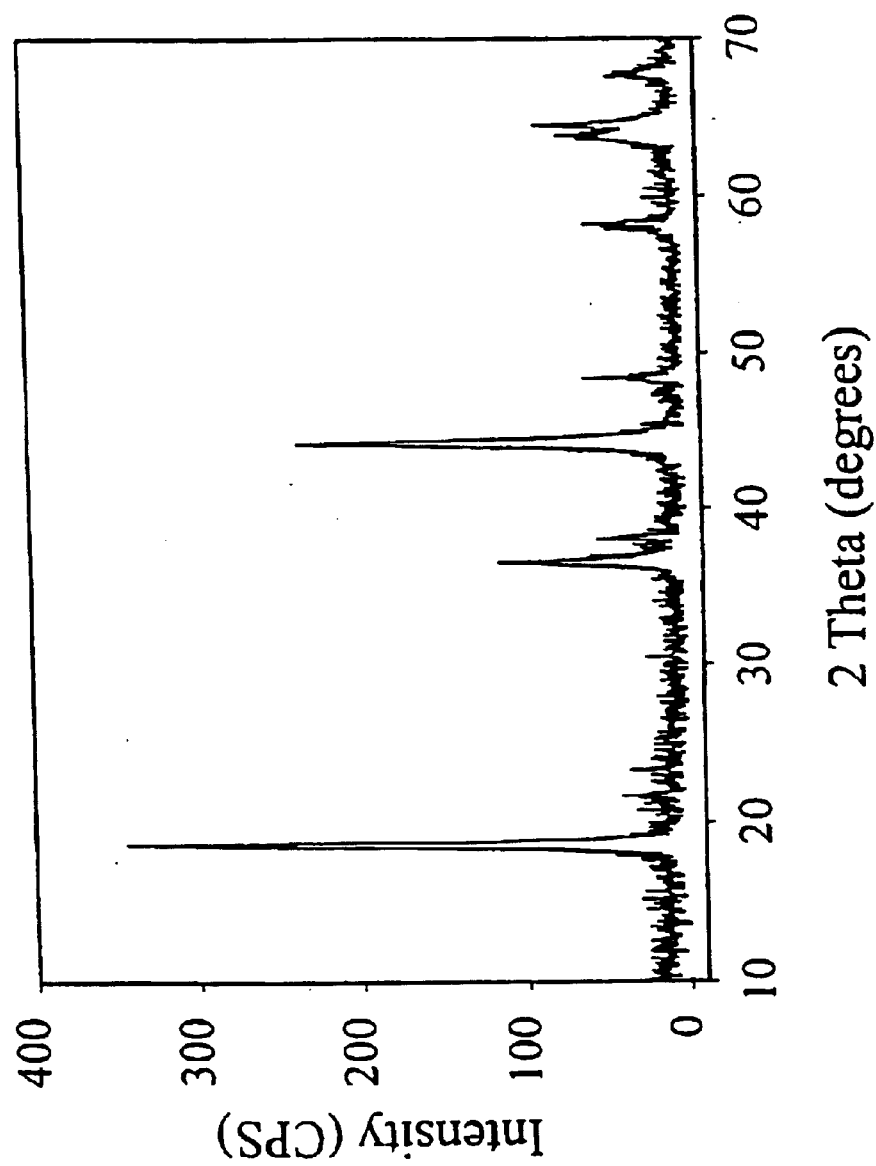
FIG. 23 is a x-ray diffraction pattern of a sample made according to example 6.

Another sample was prepared by the co-precipitation process described in example 5 using chromium sulfate, $Cr_2(SO_4)_3 \cdot xH_2O$, and manganese sulfate. $MnSO_4 \cdot H_2O$, instead of nitrate salts. The precipitation of the mixed transition metal hydroxide was initiated by the controlled addition of ammonium hydroxide. The mixed hydroxide was combined with lithium hydroxide monohydrate and heated at 650° C. in a flow of argon gas for 24 hours. A x-ray diffraction pattern of the product is provided in FIG. 23.

Figure 24:
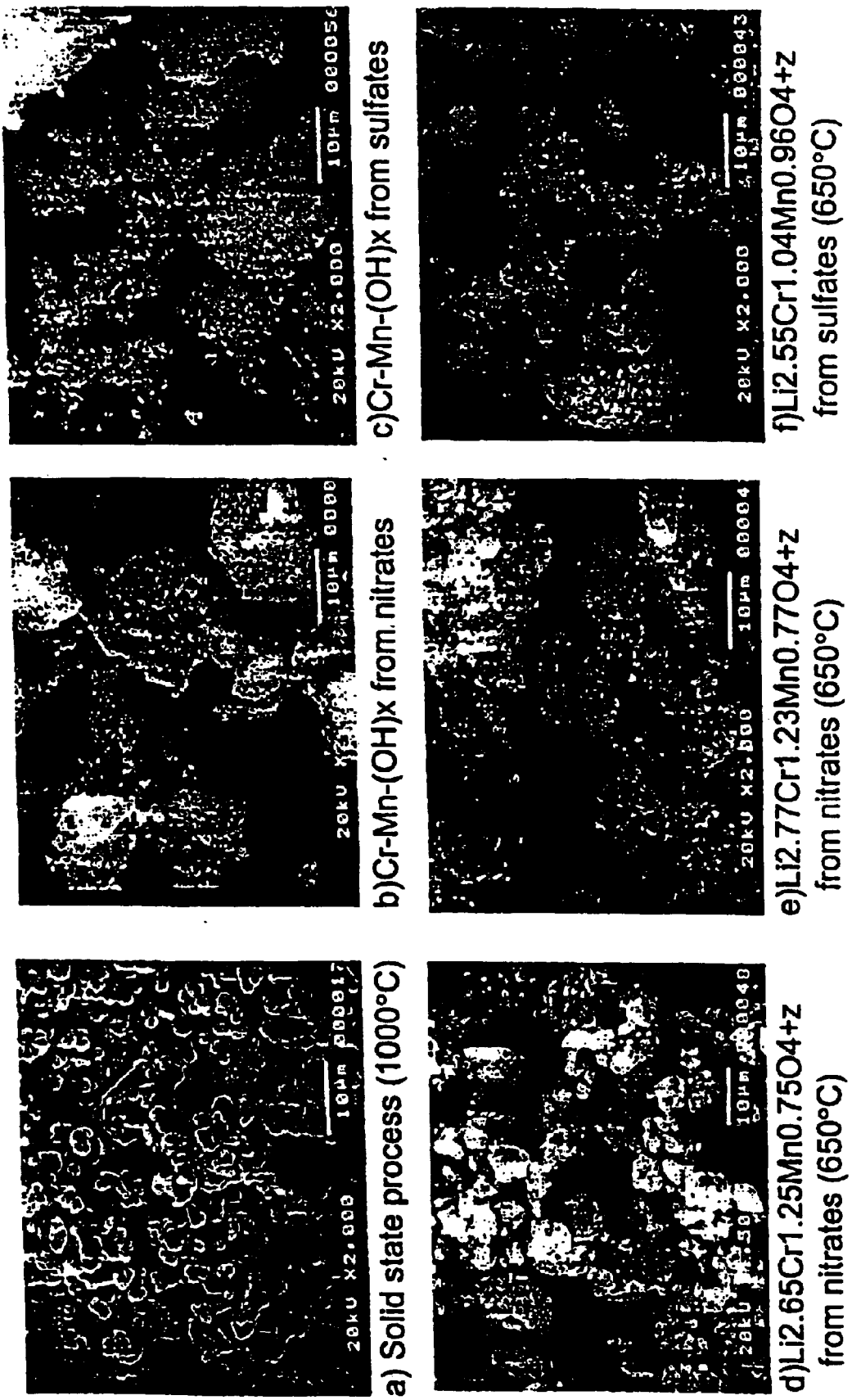
FIG. 24 shows SEM micrographs for samples described in example 6.

Scanning electron micrographs comparing samples prepared by the co-precipitation process using either nitrate or sulphate salts to those prepared at 1000° C. by a solid state process are provided in FIG. 24.

Figure 25:
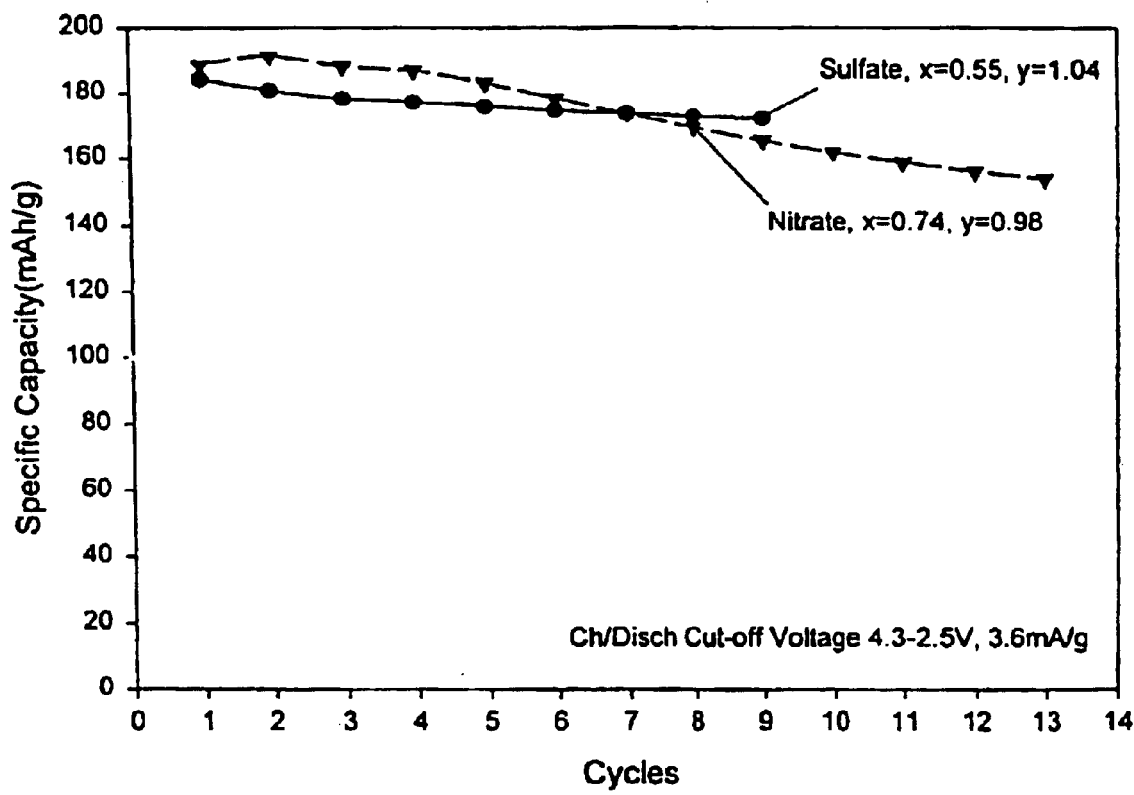
FIGS. 25–26 are plots of specific capacities for electrochemical cells assembled and tested as described in example 6.
Figure 26:
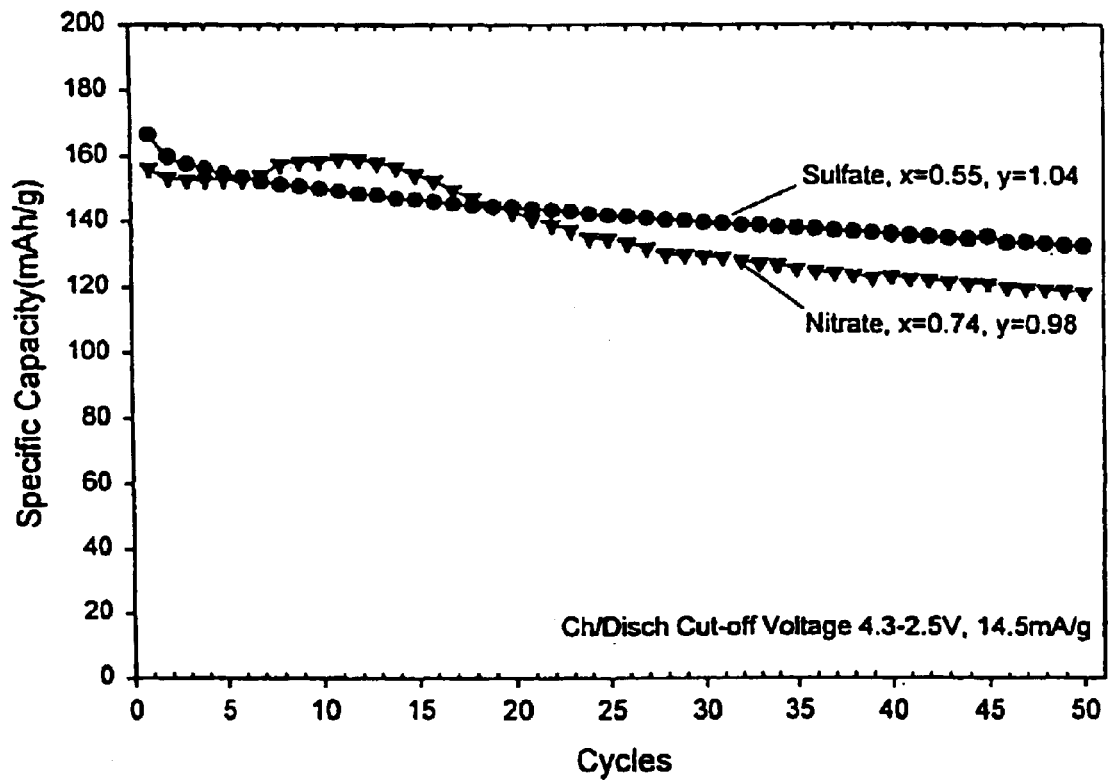

FIGS. 25 and 26 are plots of discharge capacity versus cycle number for our cells containing cathodes comprised of compounds made by the co-precipitation process from either nitrate or sulfate salts. All the cells were cycled between voltage limits of 2.5 to 4.3 volts. The two in FIG. 25 were cycled at 3.6 mA/g while those in FIG. 26 were tested at a current density of 14.5 mA/g. The compositions as determined from atomic absorption are indicated in the FIGS. 24 through 26.

We claim:

1. A compound of molecular formula I,

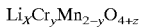

$$Li_xCr_yMn_{2-y}O_{4+z} \qquad I$$

wherein 2.25<x<3,6, 0<y<2 and z≧0.

2. A compound according to claim 1, wherein formula I, z=0.5–2.6.

3. A compound according to claim 2, wherein formula I 0.1≦y≦1.75.

4. A compound according to claim 1, further characterised by the normalised crystallographic unit cell volume, when indexed in hexagonal symmetry to a R−3 m structure, being smaller than that of $LiCrO_2$ ie. smaller than 104.9 cubic Angstroms.

5. A compound according to claim 1, further characterised by the average cation to anion bond distance being smaller than that of $LiCrO_2$.

6. A compound according to claim 1, wherein formula I, x=2.8 to 3.4, y=0.49 to 1.46 and z=0.5 to 2.6.

7. A compound according to claim 1, wherein formula I, x=2.8 to 3.4, y=1.01 to 1.46 and z=0.9 to 1.9.

8. A compound according to claim 1, wherein formula I, x=2.8 to 3.3, y=0.49 to 0.93 and z=0.5 to 2.6.

9. A compound according to claim 1, wherein formula I, x=2.25 to 3.44, y=0.98 to 1.34 and z=0.37 to 1.86.

10. A compound according to claim 1, wherein formula I, x=3.15 to 3.30, y=0.89 to 1.09 and z=1.00 to 1.54.

11. A compound according to claim 1, wherein formula I, x=2.95, y=1.09 and z=0.11, further characterised by a normalised unit cell volume of 102.1 cubic angstroms and being indexed to a hexagonal crystallographic unit cell having dimensions a=2.876 angstroms, b=2.876 angstroms, and c=14.25 angstroms.

12. A cathode for use in a secondary lithium ion electrochemical cell, comprising as active material a compound of formula I as defined in claim 1.

13. A secondary lithium ion electrochemical cell comprising, a lithium intercalation anode, a suitable non-aqueous electrolyte including a lithium salt, a cathode as defined in claim 12, and a separator between the anode and cathode.

14. An electrochemical cell according to claim 13, wherein the anode comprises a material selected from the group consisting of transition metal oxides, transition metal sulphides and carbonaceous materials, and wherein the electrolyte is in liquid form and includes a suitable organic solvent.

15. An electrochemical cell according to claim 14, wherein the lithium salt is selected from the group consisting of $LiAsF_6$, $LiPF_6$, $LiBF_4$, $LiClO_4$, LiBr, $LiAlCl_4$, $LiCF_3SO_3$, $LiC(CF_3SO_2)_3$, $LiN(CF_3SO_2)_2$, and mixtures thereof.

16. An electrochemical cell according to claim 15, wherein the organic solvent is selected from the group consisting of propylene carbonate ethylene carbonate, 2-methyl tetrahydrofuran, tetrahydrofuran, dimethoxyethane, diethoxyethane, dimethyl carbonate, diethyl carbonate, methyl acetate, methylformate, γ-butyrolactone, 1,3dioxolane, sulfolane, acetonitrile, butyronitrile, trimethylphosphate, dimethylformamide and other like organic solvents and mixtures thereof.

17. An electrochemical cell according to claim 16, wherein the anode comprises a carbonaceous material.

18. An electrochemical cell according to claim 17, wherein the anode comprises a graphitic carbon.

19. An electrochemical cell according to claim 18, wherein formula I, x=2.25–3.6, y=0.1 to 1.75 and z≧0.

20. An electrochemical cell according to claim 17, wherein the electrolyte is a solid or gelled polymer.

21. An electrochemical cell according to claim 17, wherein the electrolyte comprises 1 M $LiPF_6$ in a 1:1 mixture of ethylene carbonate and dimethyl carbonate.

* * * * *